United States Patent
Egner et al.

(10) Patent No.: US 11,277,853 B2
(45) Date of Patent: Mar. 15, 2022

(54) METHOD AND APPARATUS FOR CONTEXT AWARE CONCURRENT RADIO COMMUNICATION WITH CO-EXISTING WWAN AND WLAN RADIOS IN SHARED SPECTRUM

(71) Applicant: Dell Products, LP, Round Rock, TX (US)

(72) Inventors: Will A. Egner, Cedar Park, TX (US); Liam B. Quinn, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 16/700,876

(22) Filed: Dec. 2, 2019

(65) Prior Publication Data

US 2020/0107338 A1 Apr. 2, 2020

Related U.S. Application Data

(63) Continuation of application No. 15/367,077, filed on Dec. 1, 2016, now Pat. No. 10,499,410.

(51) Int. Cl.
*H04W 72/12* (2009.01)
*H04W 16/14* (2009.01)
(Continued)

(52) U.S. Cl.
CPC ....... *H04W 72/1231* (2013.01); *H04W 16/14* (2013.01); *H04W 72/1215* (2013.01); *H04W 84/042* (2013.01); *H04W 84/12* (2013.01)

(58) Field of Classification Search
CPC ......... H04W 72/1231; H04W 72/1215; H04W 16/14; H04W 84/12; H04W 84/042
See application file for complete search history.

(56) References Cited

U.S. PATENT DOCUMENTS

2013/0012249 A1* 1/2013 Centonza .......... H04W 72/0426
 455/501
2013/0155991 A1 6/2013 Kazmi
(Continued)

*Primary Examiner* — Sharmin Chowdhury
(74) *Attorney, Agent, or Firm* — Prol Intellectual Property Law, PLLC; H. Kenneth Prol

(57) ABSTRACT

A system and method including at least one wireless adapter for communicating on a plurality of available wireless links concurrently operating within a shared and licensed communication frequency band and an application processor executing code instructions of a radio resource management system for determining a plurality of optimal wireless links from the plurality of available wireless links within the shared communication frequency band at a location based on a spatial-temporal radio frequency profile indicating signal quality for the plurality of available wireless links. The application processor selects a WLAN wireless link and an unlicensed small cell WWAN wireless link from the plurality of optimal wireless links and determines local interference between the selected WLAN wireless link and the selected unlicensed small cell WWAN wireless link operating in the shared communication frequency band via execution of code instructions of a concurrent wireless link optimization system wherein if the determination of local interference between the selected WLAN wireless link and the selected unlicensed small cell WWAN wireless link reaches an interference threshold level, switching the unlicensed small cell WWAN wireless link to a licensed communication frequency band for small cell WWAN wireless communication.

20 Claims, 10 Drawing Sheets

(51) Int. Cl.
*H04W 84/12* (2009.01)
*H04W 84/04* (2009.01)

(56) References Cited

U.S. PATENT DOCUMENTS

| | | | |
|---|---|---|---|
| 2014/0099967 A1* | 4/2014 | Egner | H04W 72/085 |
| | | | 455/452.2 |
| 2015/0222459 A1* | 8/2015 | Rafique | H04B 17/345 |
| | | | 375/350 |
| 2015/0312867 A1* | 10/2015 | Cui | H04W 52/0206 |
| | | | 455/68 |
| 2016/0020933 A1 | 1/2016 | Rajagopal | |
| 2016/0037544 A1 | 2/2016 | Wang | |
| 2016/0380487 A1* | 12/2016 | Widmer | H02J 50/12 |
| | | | 324/654 |
| 2019/0021094 A1* | 1/2019 | Li | H04W 16/10 |

\* cited by examiner

| Wireless Device Name | Type | Frequency(GHz) | Lat | Long | BTS Utilization |
|---|---|---|---|---|---|
| AP1 | AP | 5.352 | 30.40054 | -97.66400 | 0.25 |
| SmallCell 1 | eNodeB | 5.354 | 30.40043 | -97.66368 | 0.5 |
| AP2 | AP | 5.356 | 30.40052 | -97.66348 | 0.4 |
| AP3 | AP | 5.352 | 30.40031 | -97.66334 | 0.3 |
| AP4 | AP | 5.356 | 30.40017 | -97.66354 | 0.25 |
| AP5 | AP | 5.252 | 30.40033 | -97.66390 | 0.1 |

METHOD AND APPARATUS FOR CONTEXT AWARE CONCURRENT RADIO COMMUNICATION WITH CO-EXISTING WWAN AND WLAN RADIOS IN SHARED SPECTRUM

This application is a continuation of prior application Ser. No. 15/367,077 entitled "METHOD AND APPARATUS FOR CONTEXT AWARE CONCURRENT RADIO COMMUNICATION WITH CO-EXISTING WWAN AND WLAN RADIOS IN SHARED SPECTRUM," filed on Dec. 1, 2016, which is assigned to the current assignee hereof and is incorporated herein by reference in its entirety.

FIELD OF THE DISCLOSURE

The present disclosure generally relates to a method and apparatus for a radio resources communication management system to adapt to context and usage of communication channels in relation to users having a plurality of available radiofrequency communication devices.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures. Data communications among information handling systems may be via networks that are wired, wireless, optical or some combination. Users may choose from among several available radiofrequency communication platforms in information handling systems for data and other communications with other users via communication and data networks.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Figure 1:
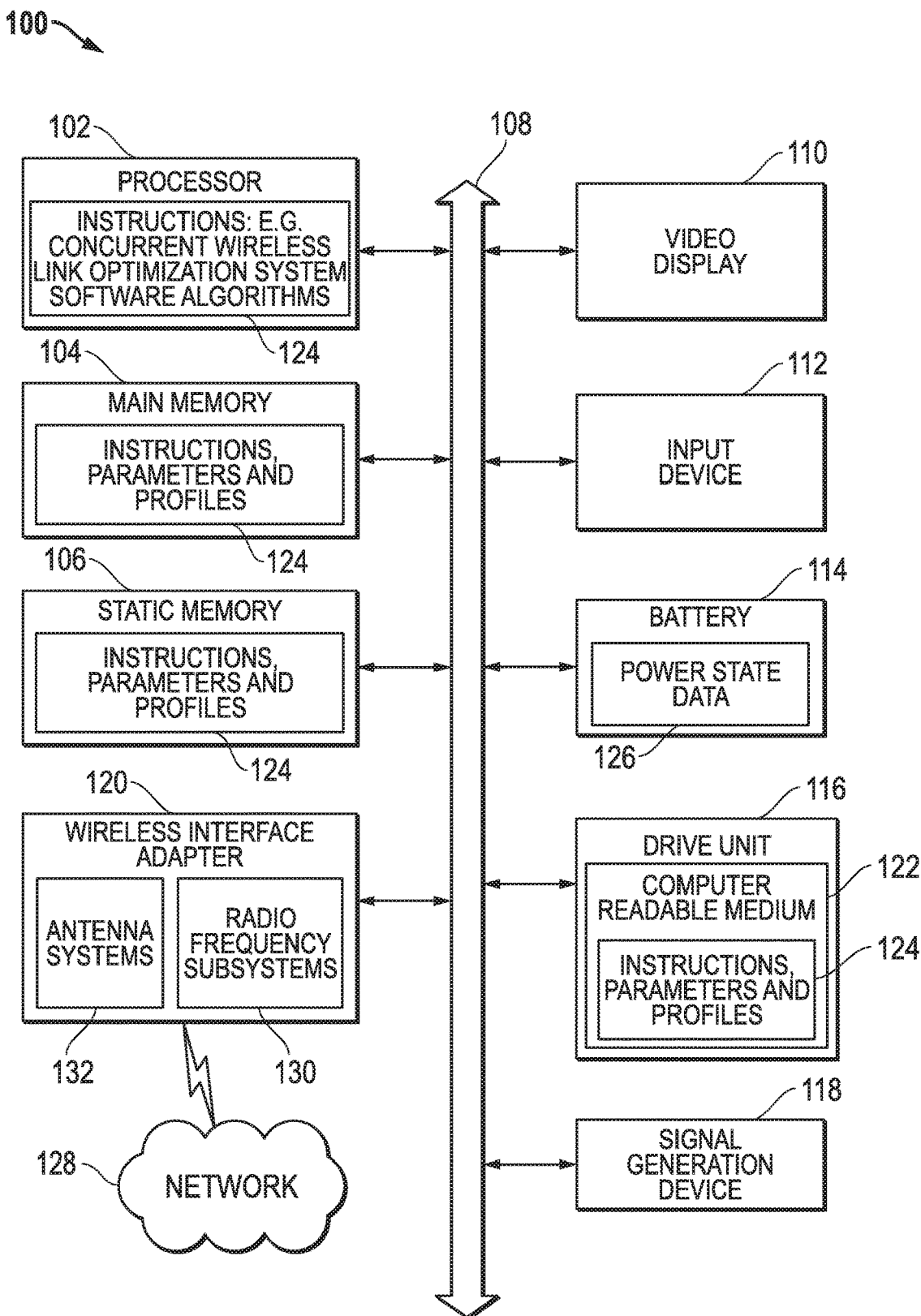
FIG. 1 is a block diagram illustrating an information handling system according to an embodiment of the present disclosure.

FIG. 1 shows an information handling system 100 capable of administering each of the specific embodiments of the present disclosure. The information handling system 100 can represent the wireless communication devices 210, 220, and 230 or servers or systems 290 located anywhere within network 200 of FIG. 2, including the remote data center 286 operating the virtual machine applications described herein. Information handling system 100 may represent a wireless communication device associated with a user or recipient of intended wireless communication. A wireless communication device may execute instructions via a processor for a context aware radio resource management system including a concurrent wireless link optimization system according to embodiments disclosed herein. The context aware radio resource management system or the concurrent wireless link optimization system may operate in some example embodiments as a software agent, in whole or in part, on a wireless communication device while other portions of the context aware radio resource management system including a concurrent wireless link optimization system may operate on remote server systems. Information handling system 100 may also represent a networked server or other system and administer aspects of the context aware radio resource management system including a concurrent wireless link optimization system via instructions executed on a processor according to various embodiments herein involving remote operation of such systems. The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a video display unit 110, such as a liquid crystal display (LCD), an organic light emitting diode (OLED), a flat panel display, a solid state display, or a cathode ray tube (CRT). Display 110 may include a touch screen display module and touch screen controller (not shown) for receiving user inputs to the information handling system 100. Additionally, the information handling system 100 may include an input device 112, such as a keyboard, and a cursor control device, such as a mouse or touchpad or similar peripheral input device. The information handling system may include a power source such as battery 114 or an A/C power source. The information handling system 100 can also include a disk drive unit 116, and a signal generation device 118, such as a speaker or remote control. The information handling system 100 can include a network interface device such as a wireless adapter 120. The information handling system 100 can also represent a server device whose resources can be shared by multiple client devices, or it can represent an individual client device, such as a desktop personal computer, a laptop computer, a tablet computer, or a mobile Smartphone.

The information handling system 100 can include a set of instructions 124 that can be executed to cause the computer system to perform any one or more of the methods or computer based functions disclosed herein. For example, instructions 124 may execute a context aware radio resource management system including a concurrent wireless link optimization system, software agents, or other aspects or components. Similarly instructions 124 may be execute the context aware radio resource management system disclosed herein for monitoring wireless links and resources. In some aspects, instructions 124 may be execute the concurrent wireless link optimization system disclosed herein for monitoring wireless device wireless adapters, wireless link access points, base stations, and other wireless resources for the purposes of assessing or modeling interference for concurrent operations within one or more wireless communication bands. Instructions 124 may also include aspects of the wireless link optimization system to remedy or adjustment to selected wireless link frequency channels that may yield interference due to nearness of transmission or reception in frequency channels and physical proximity. In other aspects instructions 124 may execute algorithms to regulate transmission or reception along those wireless channels selected but which occupy nearby, both physically and in frequency of wireless link channel, to minimize potential effects of interference. Various software modules comprising application instructions 124 may be coordinated by an operating system (OS) and via an application programming interface (API). An example operating system may include Windows®, Android®, and other OS types known in the art. Example APIs may include Win 32, Core Java API, or Android APIs. In a further example, processor 102 may conduct monitoring and processing of wireless communication device usage trends by the information handling system 100 according to the systems and methods disclosed herein. The computer system 100 may operate as a standalone device or may be connected such as using a network, to other computer systems or peripheral devices.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a PDA, a mobile information handling system, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or subsystems that individually or jointly execute a set, or multiple sets, of instructions to perform one or more computer functions.

The disk drive unit 116 may include a computer-readable medium 122 in which one or more sets of instructions 124 such as software can be embedded. Similarly, main memory 104 and static memory 106 may also contain computer-readable medium for storage of one or more sets of instructions, parameters, or profiles 124. The disk drive unit 116 and static memory 106 also contains space for data storage. Further, the instructions 124 may embody one or more of the methods or logic as described herein. For example, instructions relating to the context aware radio resource management system including the concurrent wireless link optimization system software algorithms may be stored here. Additionally, wireless communication device usage trend data for the context aware radio resource management system, interference models or measured interference profiles for the concurrent wireless link optimization system and wireless link profiles relating to context aware radio resource management system may be stored here in main memory 104, static memory 106, drive unit 116, or remotely via network 128. Wireless link profiles stored here may include end-user profile data measured by the processor 102 during wireless link usage. Profiles may additionally include crowd sourced spatial-temporal radio frequency profiles for wireless links or for energy link consumption data. Interference profiles may include models relating to locations of transmitters with respect to one another and relate to closeness (or identity) of operating frequencies during concurrent operation with a communication frequency band. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the concurrent wireless link optimization system or the context aware radio resource management system may be executed locally or remotely. The main memory 104 and the processor 102 also may include computer-readable media. Battery 114 may include a smart battery system that tracks and provides power state data 126. This power state data may be stored with the instructions, parameters, and profiles 124 to be used with the systems and methods disclosed herein.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency subsystems 130 with transmitter/receiver circuitry, wireless controller circuitry, amplifiers and other circuitry for wireless communications. Each radiofrequency subsystem 130 may communicate with one or more wireless technology protocols. The radiofrequency subsystem 130 may contain individual subscriber identity module (SIM) profiles for each technology service provider and their available protocols. Alternatively it may have a software based SIM profile that is reconfigurable. In yet another aspect, the radiofrequency subsystem may include an eSIM for electronic control over activate SIM profile being used depending on the results of wireless link optimization analysis for context aware radio resource management system and for concurrent radio operation interference modeling or assessment. The wireless adapter 120 may also include antenna system 132 which may be tunable antenna systems for use with the system and methods disclosed herein.

In some aspects of the present disclosure, one wireless adapter 120 may operate two or more wireless links. In a further aspect, the wireless adapter 120 may operate the two or more wireless links with a single, shared communication frequency band such as with the 5G standard relating to unlicensed wireless spectrum for small cell 5G operation or for unlicensed Wi-Fi WLAN operation in an example aspect. For example, a 5 GHz wireless communication frequency band may be apportioned under the 5G standards for communication on either small cell WWAN wireless link operation or Wi-Fi WLAN operation as described further below.

In some embodiments, the shared, wireless communication band may be transmitted through one or a plurality of antennas. Other shared communication frequency bands are contemplated for use with the embodiments of the present disclosure as well.

In other aspects, the information handling system 100 operating as a wireless communication device may operate a plurality of wireless adapters 120 for concurrent radio operation in one or more wireless communication bands. The plurality of wireless adapters 120 may further share a wireless communication band in some disclosed embodiments. The proximity of concurrent radio transmission or reception in a shared band precipitates a need to assess or model interference for concurrently operating wireless communication devices as with the context aware radio resource management system including a concurrent wireless link optimization system of the present disclosure. Similarly, the proximity of concurrent radio transmission or reception in a shared band may further precipitate provide a remedy or adjustment to selected wireless link frequency channels or transmission or reception along those wireless channels in view of the concurrent wireless link optimization system of the present disclosure.

The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 may connect to any combination of macro-cellular wireless connections including 2G, 2.5G, 3G, 4G, 5G or the like from one or more service providers. The wireless adapter 120 can represent an add-in card, wireless network interface module that is integrated with a main board of the information handling system or integrated with another wireless network interface capability, or any combination thereof. In an embodiment the wireless adapter 120 may include one or more radio frequency subsystems 130 including transmitters and wireless controllers for connecting via a multitude of wireless links. In an example embodiment, an information handling system may have an antenna system transmitter 132 for 5G small cell WWAN, Wi-Fi WLAN or WiGig connectivity and one or more additional antenna system transmitters 132 for macro-cellular communication. The radio frequency subsystems 130 include wireless controllers to manage authentication, connectivity, communications, power levels for transmission, buffering, error correction, baseband processing, and other functions of the wireless adapter 120.

The radio frequency subsystems 130 of the wireless adapters may measure various metrics relating to wireless communication pursuant to operation of a context aware radio resource management system as in the present disclosure. For example, the wireless controller of a radio frequency subsystem 130 may manage detecting and measuring received signal strength levels, bit error rates, signal to noise ratios, latencies, jitter, and other metrics relating to signal quality and strength. In one embodiment, a wireless controller may manage one or more radio frequency subsystems 130 within a wireless adapter 120. The wireless controller also manages transmission power levels which directly affect radio frequency subsystem power consumption. To detect and measure power consumption by a radio frequency subsystem 130, the radio frequency subsystem 130 may implement current and voltage measurements of power that is directed to operate a radio frequency subsystem. The voltage and current provides power measurement in milliwatts. Energy consumed may be calculated from sample measurements by taking average power measured over a duration of transmission. In an alternative embodiment of power measurement, counter registers may be used to estimate power consumed during transmissions. Energy measurement may be a sampled during a count cycle. In this case, a sample energy measurement per count is multiplied into a count for operation of a radio subsystem. In this way, power consumption may be estimated in an example embodiment.

The wireless network may have a wireless mesh architecture in accordance with mesh networks described by the wireless data communications standards or similar standards. The wireless adapter 120 may also connect to the external network via a WPAN, WLAN, WWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the network 128. Further, the instructions 124 may be transmitted or received over the network 128 via the network interface device or wireless adapter 120.

Information handling system 100 includes one or more application programs 124, and Basic Input/Output System and firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in drive 116, in a ROM (not illustrated) associated with information handling system 100, in an option-ROM (not illustrated) associated with various devices of information handling system 100, in storage system 107, in a storage system (not illustrated) associated with network channel of a wireless adapter 120, in another storage medium of information handling system 100, or a combination thereof. Application programs 124 and BIOS/FW code 124 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Figure 2:
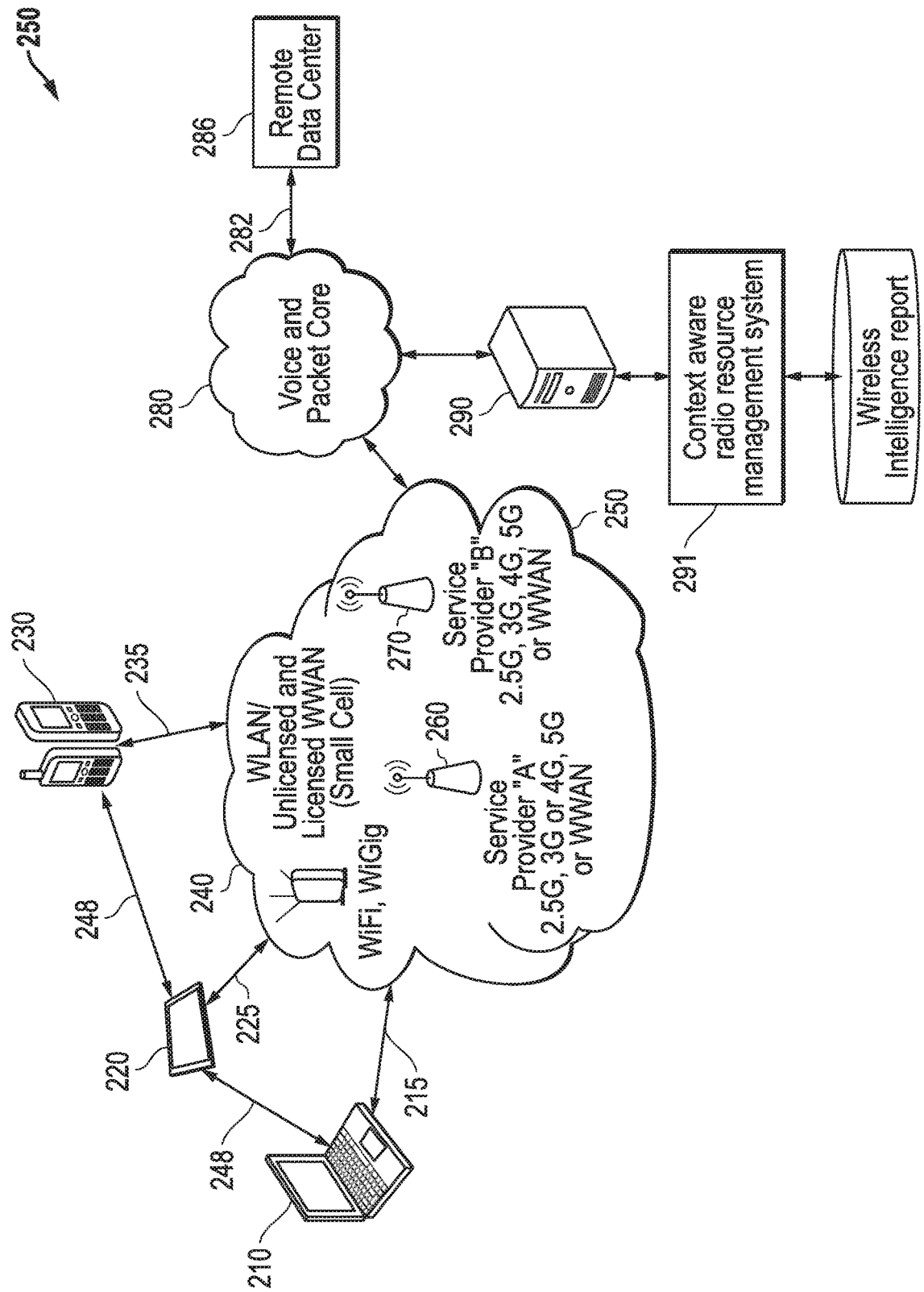
FIG. 2 is a block diagram of a network environment offering several communication protocol options and wireless communication devices according to an embodiment of the present disclosure.

FIG. 2 illustrates a network 200 that can include one or more information handling systems. In a particular embodiment, network 200 includes networked wireless communication devices 210, 220, and 230, wireless network access points, and multiple wireless connection link options. A variety of additional computing resources of network 200 may include client mobile information handling systems, data processing servers 290, network storage devices, local and wide area networks, or other resources as needed or desired. As specifically depicted, systems 210, 220, and 230 may be a laptop computer, tablet computer, or Smartphone device. These wireless communication devices 210, 220, and 230, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with an anchor small-cell WWAN wireless option with a supplemental unlicensed small cell WWAN wireless link option as well. In this example embodiment, the licensed LTE-LAA WWAN anchor link and the unlicensed small cell WWAN supplemental link may operate in different communication frequency bands. Similar arrangements for emerging 5G and other upcoming protocols are similarly contemplated in some embodiments. For example, emerging 5G may include small cell anchor WWAN data on a licensed band and supplemental small cell WWAN on an unlicensed band. In an embodiment of the present disclosure, the supplemental small cell WWAN radio capability may become a more primary source of data and communication links if the cost and availability of such wireless links become more prevalent. Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network. For example, wireless network access points may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, or emerging 5G small cell WWAN communications such as eNodeB, or similar wireless network protocols. Alternatively, other available wireless links within network 200 may include macro-cellular connections 250 via one or more service providers 260 and 270. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells.

In some embodiments according to the present disclosure, a networked wireless communication device 210, 220, or 230 may have a plurality wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or plural antennas may be used on each of the wireless communication devices. Example competing protocols may be local wireless network access protocols such as Wi-Fi, WiGig, and small cell WLAN in an unlicensed, shared communication frequency band. Example communication frequency bands may include unlicensed 5 GHz frequency bands or 3.5 GHz conditional shared communication frequency bands under FCC Part 96. Wi-Fi ISM frequency bands that could be subject to future sharing include 2.4 GHz, 60 GHz, 900 MHz or similar bands as understood by those of skill in the art. Within local portion of wireless network 250 access points for Wi-Fi or WiGig as well as small cell WWAN connectivity may be available in emerging 5G technology. This may create issues with selection of optimal wireless links when concurrent communication on both WLAN and WWAN access may operate within the same communication frequency bands. Such issues may be addressed or mitigated with remedies according to the context aware radio resource management system including a concurrent wireless link optimization system 291 according to embodiments herein.

The voice and packet core network 280 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional wireless communication devices such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a wireless communication device or may connect directly to one or more wireless communication devices 210, 220, and 230. Alternatively, wireless communication devices 210, 220, and 230 may connect to the external network via base station locations at service providers such as 260 and 270. These service provider locations may be network connected via backhaul connectivity through the voice and packet core network 280.

Remote data center 286 may include web servers or resources within a cloud environment. For example, remote data centers can include additional information handling systems, data processing servers, network storage devices, local and wide area networks, or other resources as needed or desired. Having such remote capabilities may permit fewer resources to be maintained at the wireless communication devices 210, 220, and 230 allowing streamlining and efficiency within those devices. Similarly, remote data center 286 permits fewer resources to be maintained in other parts of network 200.

In an example embodiment, the cloud or remote data center 286 or networked server 290 may run hosted applications for systems 210, 220, and 230. For example, remote data center 286, networked server 290, or some combination of both may operate some or all of a context aware radio resource management system including a concurrent wireless link optimization system as disclosed in the present disclosure. This may occur by establishing a virtual machine application executing software to manage applications hosted at the remote data center 286 in an example embodiment. Wireless communication devices 210, 220, and 230 are adapted to run one or more applications locally, and to have hosted applications run in association with the local applications at remote data center 286 or networked server 290. For example, wireless communication devices 210, 220, and 230 may operate some or all of the context aware radio resource management system including a concurrent wireless link optimization system agent in some embodiments. The virtual machine application may serve one or more applications to each of wireless communication device 210, 220, and 230. Thus, as illustrated, systems 210, 220, and 230 may be running applications locally while requesting data objects related to those applications from the remote data center 286 via wireless network. In another example, an electronic mail client application may run locally at system 210. The electronic mail client application may be associated with a host application that represents an electronic mail server. In another example, a data storage client application such as Microsoft Sharepoint may run on system 220. It may be associated with a host application running at remote data center 286 that represents a Sharepoint data storage server. In a further example, a web browser application may be operating at system 230. The web browser application may request web data from a host application that represents a hosted website and associated applications running at remote data center 286.

Although 215, 225, and 235 are shown connecting wireless adapters of wireless communication devices 210, 220, and 230 to wireless networks 240 or 250, wireless communication may link through a wireless access point (Wi-Fi or WiGig), through unlicensed WWAN small cell base stations such as in network 240 or though a service provider tower such as that shown with service provider A 260 or service provider B 270 and in network 250. In other aspects, wireless communication devices 210, 220, and 230 may communicate intra-device via 248 when one or more of the wireless communication devices 210, 220, and 230 are set to act as a access point or even potentially an WWAN connection via small cell communication on licensed or unlicensed WWAN connections. For example, one of wireless communication devices 210, 220, and 230 may serve as a Wi-Fi hotspot in an embodiment. Since one aspect of the disclosed embodiments involves assessment and selection of wireless links by a context aware radio resource management system including a concurrent wireless link optimization system using a context aware radio resource management system, no particular wireless link selection is depicted in FIG. 2.

The connection quality of service (QoS) and speed of wireless links 215, 225, and 235 may vary widely depending on several factors including the service provider bandwidth, the number of wireless communication devices and users in a location, and other factors. Quality of service impacts energy consumption and efficiency of a wireless communication device communicating wirelessly. Thus, selection of a wireless link may depend on assessment of the link radio frequency conditions. Assessment of link radio frequency conditions may be made via a context aware radio resource management system and a link rating developed for links. Radio frequency conditions for wireless links will evolve over time. Differences in wireless link QoS or efficiency will also vary minute-by-minute, hourly, daily, weekly or monthly or during even longer periods. Thus, assessment may need to be regular. Wireless intelligence reports may be gathered or crowd sourced in a database accessible by the context aware radio resource management system including the concurrent wireless link optimization system. The wireless intelligence report data base may include wireless link data with respect to wireless link quality of service and experience for a plurality of wireless links at various locations and for particular types of data usage. Additional database information may be available to the context aware radio resource management system including a concurrent wireless link optimization system relating to wireless service usage trends for wireless communication devices such as 210, 220, and 230. These wireless service usage trends may be tracked according to time of day, day of the week, location or other similar factors to indicate how wireless links are used in wireless communication devices such as 210, 220, and 230.

Wireless link conditions will vary depending on the type of service likely to be requested by the mobile information handling system. For example, voice communication may be most efficient on a 2G wireless protocol. Voice communication on 4G and emerging 5G may be more costly in terms of time required for authentication and connectivity negotiation or in terms of transmission power requirements. Data services relating to messaging and SMTP email may have the lowest power cost on 2.5G protocols due to the simplest access barriers there. Higher level data services requiring greater wireless bandwidth may more efficiently use recently implemented protocols. For example, audio streaming may be optimal for 3G protocols. Video streaming and HTTP web browsing may be best suited to 4G protocols or emerging 5G and much less efficient at lower protocols which are not designed to accommodate large data throughput.

As the protocols become more advanced, additional registration and initialization for data becomes costly from a processing and power consumption standpoint. This is balanced against the capabilities of the more advanced protocols to handle data transfers. More complicated communication protocols result in greater processing time and authentication/connection message exchange. More robust processor or controller operation and longer delays for transmitter or receiver circuits consume power. On the other hand, certain protocol advancements are designed to make data transfers quicker and more efficient. Thus for example, the 4G or 5G protocol may generally consume more power during operation than 2.5G for voice communications, but less power for high volume data transfers.

For this reason, the wireless communication device operating context can play an important role in determining wireless link conditions and efficiency from a power consumption standpoint. Information about wireless link connection quality and capacity for a service to be used can be advantageous in optimizing communication channel selection. In most cases, transmission or reception via a macro-cellular network 250 base station at a service provider 260 or 270 will take more power than communication via WLAN such as Wi-Fi. Among macro-cellular systems, energy consumption generally, but not in all circumstances, increases at each advancement of technology protocol from 2G to 5G. Plus, increased traffic levels on an advanced macro-cellular protocol may slow down in comparison to an older technology with less active traffic. Additional future macro-cellular protocols are contemplated as well. Those protocols may require additional energy demands of mobile information handling systems. Additionally, often the QoS of an end-to-end wireless communication path between wireless communication devices of a user and a recipient will most directly be affected the QoS levels at the end stages of the wireless communication path. For example, the wireless link QoS between a user wireless communication device and the wireless network on one end and the wireless link QoS between a recipient wireless communication device on the other end are often the places where communication path quality compromise, capacity limitation, or latency is most likely to occur.

Factors impacting energy consumption include switching and signaling during communication access, setup, and authentication. Additional factors that impact energy consumption include control communications, latencies, transmission/reception, and switching for the wireless link. As described above, these factors can be specific to the type of wireless service being requested, whether voice, messaging, SMTP, Audio, Video, HTTP or other service types. It can also be specific to the wireless communication device used. Certain protocols may not be available on some mobile information handling systems. In each instance, radio frequency transmission subsystems and controllers operate and consume device power. Based on these numerous factors, the system of the present embodiment may automatically switch between radio network technologies or service providers to optimize radio frequency conditions, traffic conditions, device power consumption, cost, or any of the above. Selection of a wireless service provider and technology protocol may generally depend on the optimal wireless technology used for a service requested, the radio frequency conditions of a link, traffic conditions for the wireless link, and availability of a link.

Further, concurrent radiofrequency bands may be used having several channels for wireless link connections and which may include with potential overlapping use of shared radiofrequency bands including unlicensed bands and conditional shared communication frequency bands available under FCC Part 96 with use under Wi-Fi and emerging 5G technologies such as unlicensed small cell wireless links. Accordingly, wireless links 215, 225 and 235 may represent concurrent wireless links for two or more protocols operating within similar frequency bands. With the rise of multiple wireless protocols operating within shared communication frequency bands, wireless links may operate on separate channels within the communication frequency band, including within neighboring channels. In other aspects, the possibility further arises that wireless protocols within a communication frequency band may even attempt to operate on the same channel within a shared communication frequency band. Aspects of the present disclosure may determine potential conflicts within shared communication frequency bands as well as manage or mitigate interference that may arise within such situations.

A context aware radio resource management system with a concurrent wireless link optimization system 291 may assess channels for potential interference and conflict within the shared communication frequency bands. The context aware radio resource management system 291 may maintain RF traffic reports relating to wireless links at a database. That database may be located within the wireless network for example at remote data center 286. RF traffic report database aggregates wireless link QoS data across the wireless network and with respect to wireless communication devices operating with the context aware radio resource management system including a concurrent wireless link optimization system of the present disclosure. The RF traffic report database of the context aware radio resources system maintains performance data of service providers and various wireless protocols available for parts of a wireless communication path. The aggregated RF traffic report database may be accumulated or crowd sourced from multiple wireless communication devices operating on a given network or networks. This feature will be described further below.

Further, the concurrent wireless link optimization system of the context aware radio resource management system 291 may determine or model interference to be experienced by selection of wireless links for multiple protocols, or even for a protocol operating on several channels, that operate simultaneously within a radiofrequency communication band. Wi-Fi/WiGig and small cell WWAN protocols, in an example embodiment, may operate in the same shared communication frequency bands. Data relating to neighborhood interference lists, access point and small cell substation locations, and modeled or measured interference during operation of simultaneous wireless links within a shared communication radiofrequency band are stored by the concurrent wireless link optimization system portion of the context aware radio resource management system 291 in a database, at a remote data center 286, or at individual wireless communication mobile devices 210, 220, or 230. The concurrent wireless link optimization system 291 may determine or alter selection of optimal wireless links based on assessment of potential interference or collision from selection of those wireless links and the channels within the shared band on which they are operating. In other embodiments, the concurrent wireless link optimization system 291 may implement interference or collision mitigation strategies if optimal wireless links are to be selected due to availability, link quality, usage trends, cost, power or other factors taken into consideration by the wider context aware radio resource management system. In another example embodiment where licensed and unlicensed small cell WWAN communications are available, utilization of the free, unlicensed small cell WWAN on a shared communication frequency band may be turned off and the anchor licensed small cell WWAN on a licensed communication frequency band may be used instead to avoid interference or potential packet collision. Several example embodiments of the operation of the wireless link optimization system 291 are described in the present disclosure.

Figure 3:
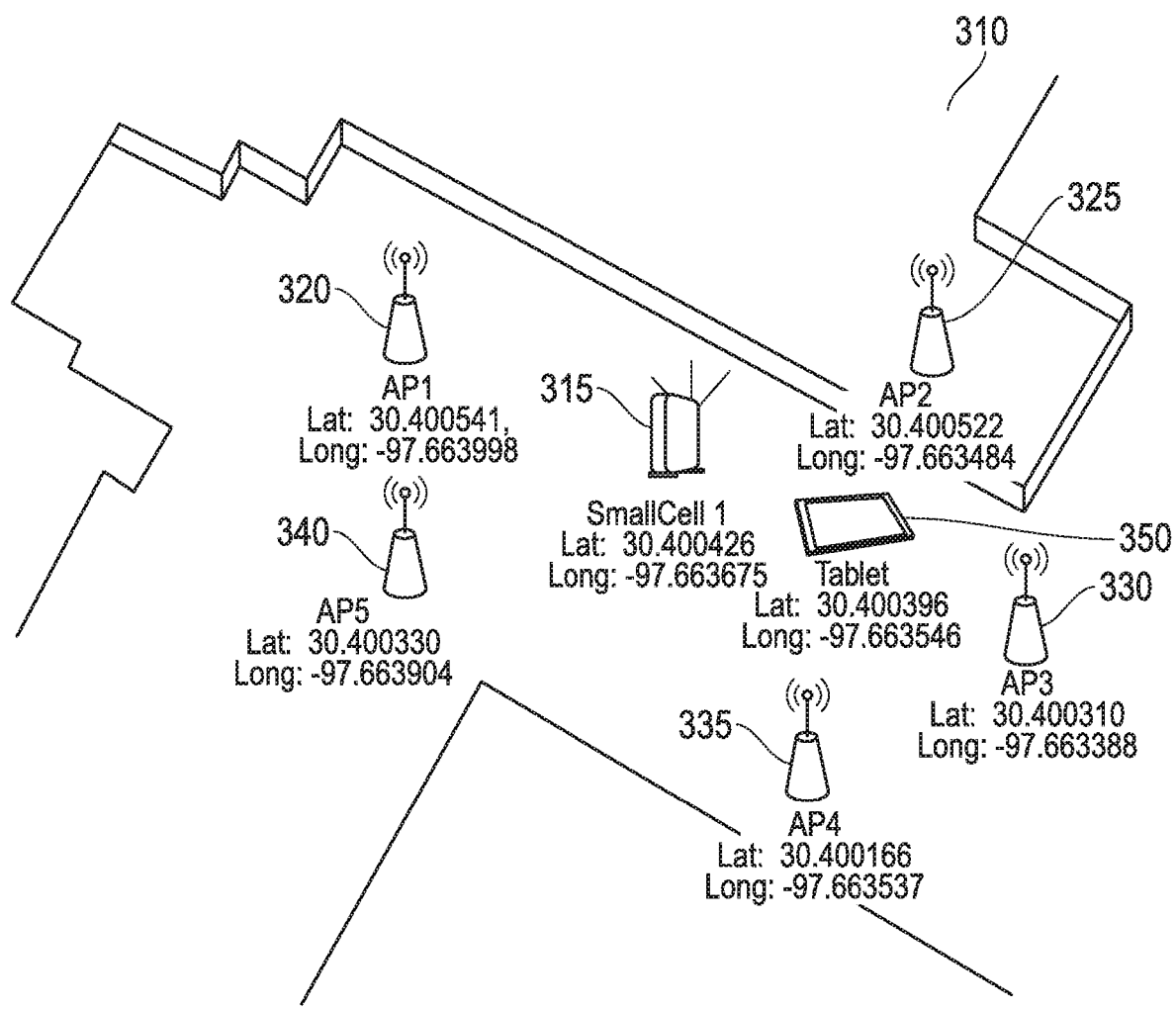
FIG. 3 is a block diagram illustrating a wireless network neighborhood for a plurality of wireless access types available to an information handling system using according to an embodiment of the present disclosure.

FIG. 3 illustrates a wireless neighborhood 310 in an example embodiment. The wireless neighborhood may be a building, campus, shopping area, airport, or other area having a plurality of competing wireless link options available. In some aspects, the wireless neighborhood may be facilities or a campus associated with an enterprise, military, university, government or municipal organization. Within wireless neighborhood 310 there is a plurality of base transceiver systems (BTSs) including several access points (APs) including AP1 320, AP2 325, AP3 330, AP4 335, and AP5 340. As shown, each of the access points may record and report a position including latitude and longitude values. Additionally, in wireless neighborhood 310 is a small cell WWAN substation such as FemtoCell1 315. FemtoCell1 315 additionally may report a latitude and longitude location information. Reports of location may be made to the context aware radio resource management system including a concurrent wireless link optimization system.

Wireless neighborhood 310 represents a plurality of BTSs operating within a shared communication frequency band such as U-NII band in an example embodiment. In a further example embodiment, mobile information handling system such as tablet 350 may have access to carrier licensed small cell WWAN service under emerging 5G and other technologies. With the carrier licensed small cell WWAN service, an anchor FemtoCell small cell BTS (not shown) may be available for WWAN access under a separate licensed communication frequency band. The licensed communication frequency band may be licensed to a specific wireless service provider or other carrier. Since the licensed communication frequency band is a distinct band from the shared unlicensed communication frequency band, local interference between the two bands is reduced. However, a licensed communication frequency band such as via an anchor FemtoCell small cell BTS will have a cost associated with it and may be less desirable than bandwidth on an available unlicensed small cell WWAN BTS. The unlicensed small cell WWAN capacity for mobile information handling system 350 may be supplementary bandwidth to the licensed small cell WWAN in an example embodiment. Determination of interference risk for use of the supplementary unlicensed small cell WWAN link may be used in assessment of options between licensed and unlicensed small cell WWAN to be used by mobile information handling system 350 according to some embodiments.

The concurrent wireless link optimization system may create neighboring interference lists such as 305. Each of the wireless devices are listed in the wireless neighborhood and the type of wireless link supported may be determined. Further, neighboring interference lists 305 may include operating channel frequencies and location of each of the wireless link access options that are either APs or small cell WWAN substations in the present embodiment. These operating channel frequencies are those that fall within a shared communication frequency band in an embodiment. Finally, the concurrent wireless link optimization system may establish BTS utilization metrics which may involve estimation of levels or rating of utilization of the APs and the small cell WWAN substations in the neighboring interference lists 305.

Figure 4:
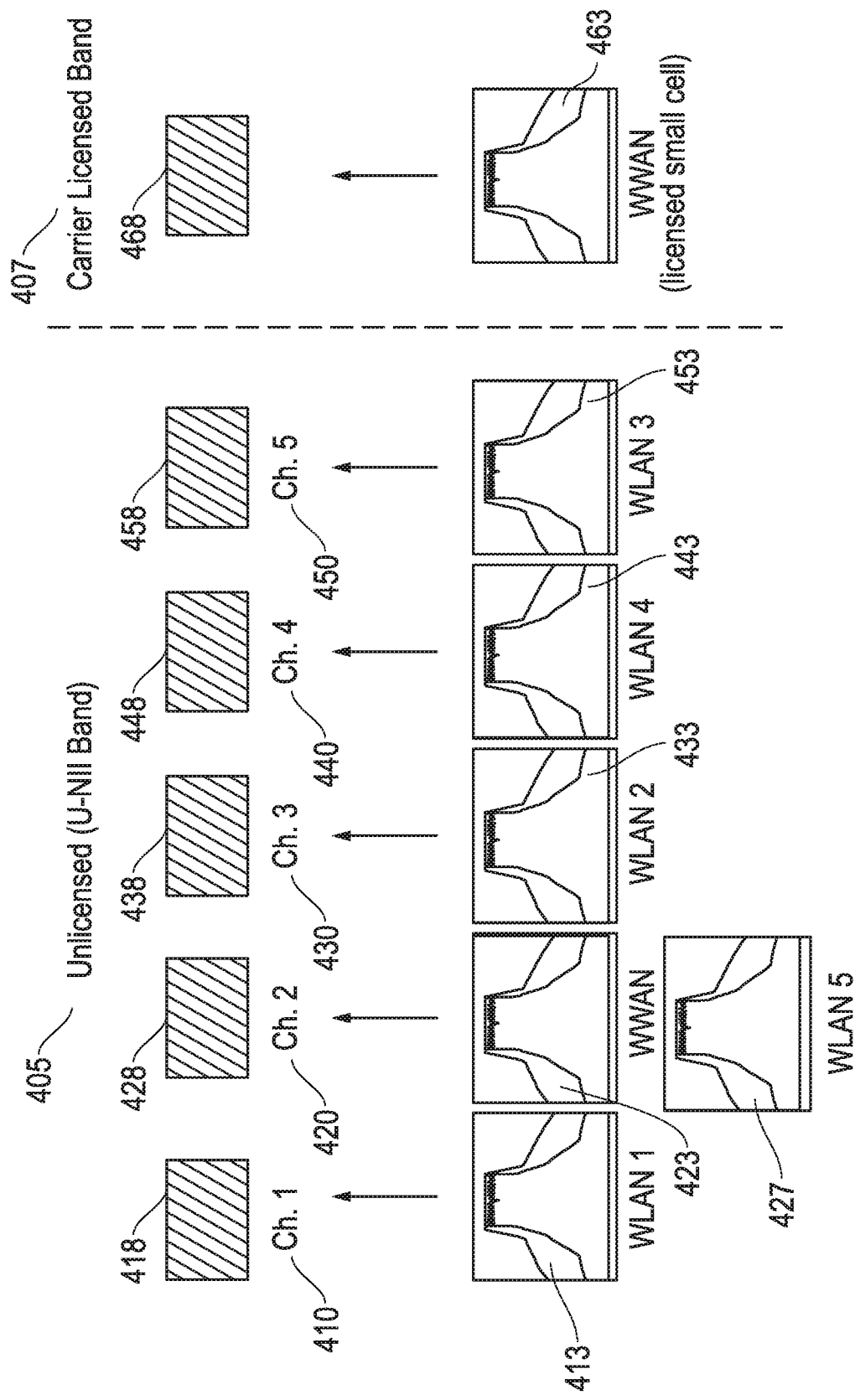
FIG. 4 is a block diagram illustrating intra-device operation of an information handling system within a communication frequency band according to an embodiment of the present disclosure.

FIG. 4 illustrates an example utilization of a shared radiofrequency communication band according to an example embodiment of the present disclosure. In particular, the embodiment of FIG. 4 shows use of the Unlicensed National Information Infrastructure (U-NII) band 405 which typically operates in the ~5 MHz frequency band such as 802.11 a/h/j/n/ac (e.g., center frequencies between 5.170-5.785 GHz). In this example embodiment, five channels 410, 420, 430, 440, and 450 are shown for illustrative purposes. It is understood that any number of available channels may be available under the 5 GHz shared communication frequency band.

The embodiment of FIG. 4 also shows an available anchor licensed small cell WWAN 463 on a channel in a carrier licensed band 407. Carrier licensed band 407 may be a subscriber wireless service band assigned to any of the wireless service carriers as understood by those of skill. Licensed small cell WWAN 463 may include a device selected channel 468 that may serve as an anchor small cell WWAN for licensed service to a mobile information handling system. As described in other embodiments, use of licensed small cell WWAN may incur a data cost such as a data usage cost for a subscriber. Thus, use of a supplemental option such as WWAN 423 in the unlicensed communication frequency spectrum 405 may be a preferable option from a data cost perspective.

Channel 1 410 represents a device selected channel 418 for WLAN 1 413 (and showing a frequency spectrum across channel 1 410). Similarly, device selected channel 428 for WLAN 5 427 may arise at channel 2 420 in an embodiment which is a neighboring channel to channel 1 410. In another embodiment aspect, device selected channel 428 may also be selected for unlicensed small cell WWAN 423. Each of WLAN 5 427 and small cell WWAN 423 may be device selected for channel 2 420. In such an example, two wireless links may occupy the same channel raising potential for both interference and collision when operating from the mobile wireless device. This may occur because the wireless links arise under different wireless link protocols operating within the same shared communication frequency band, in this example embodiment the U-NII 5 GHz band. In embodiments of the present disclosure, determination of concurrent wireless links such as WLAN 5 427 and unlicensed WWAN 423 on a same channel 2 420 may cause the concurrent wireless link optimization system to select anchor licensed WWAN 463 instead of unlicensed WWAN 423. In some other embodiments of the present disclosure, determination of concurrent wireless links such as WLAN 1 427 and unlicensed WWAN 423 adjacent channels may cause the concurrent wireless link optimization system to select anchor licensed WWAN 463 instead of unlicensed WWAN 423. In other aspects of embodiments herein, collision or interference mitigation strategies may be employed to nonetheless enable use of an unlicensed small cell WWAN 423.

Device selected channel 438 may arise for WLAN 2 433 on channel 3 430. Device selected channel 448 may arise for WLAN 4 443 on channel 4 440. Device selected channel 458 may arise for WLAN 3 453 on channel 5 450. It is understood that the selection of wireless links for device selected channels by various WLAN options and between protocols is for illustration purposes for an example embodiment of operating on a shared communication frequency band. Any set of channels and selection of wireless links for WLAN or small cell WWAN may arise depending on available BTSs operating as APs and small cell substations and the channels those devices select to operate on in the wireless neighborhood. Another example of a selection of frequency channels is depicted in FIG. 3 for five APs and an unlicensed small cell substation in the neighboring interference list 305 for a wireless neighborhood 310.

Figure 5:
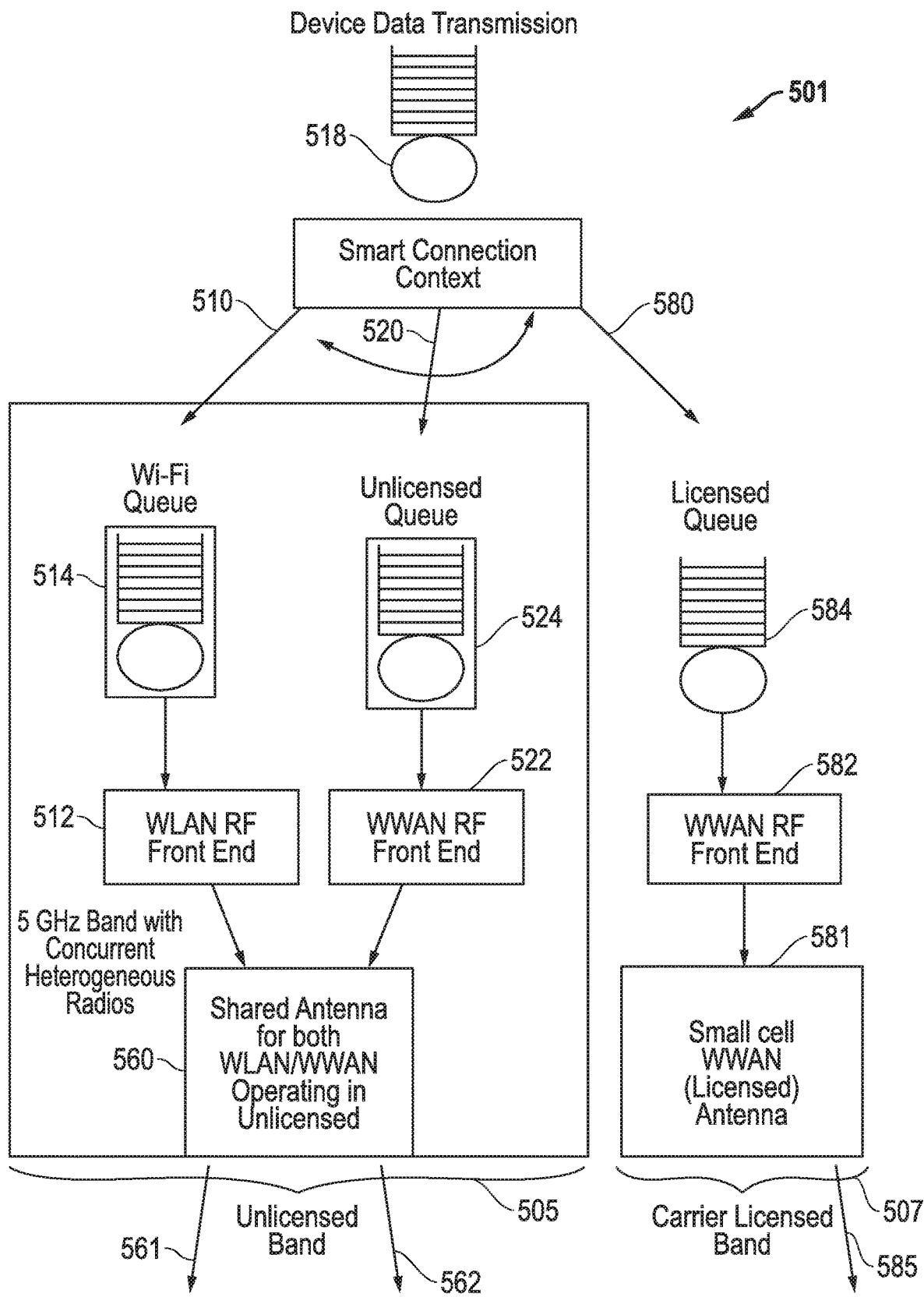
FIG. 5 is a block diagram illustrating shared antenna operation of an information handling system according to an embodiment of the present disclosure.

FIG. 5 illustrates another example utilization of a shared radiofrequency communication band with an anchor licensed communication according to an example embodiment of the present disclosure. In FIG. 5, wireless communication device 501 may communicate according to two protocols, WLAN such as Wi-Fi and small cell WWAN having both a licensed anchor WWAN component and an unlicensed supplemental WWAN component. The WLAN and small cell WWAN unlicensed supplemental WWAN component may operate within a shared communication frequency band 505. In the example embodiment, wireless communication device 501 may operate within a shared, unlicensed band 505 such as at a 5 GHz communication frequency band via concurrent heterogeneous radios. In a further aspect, wireless communication device 501 may operate in a carrier licensed band 507 for local WWAN operation such as 700 MHz, 800 MHz, 1900 MHz, or 1700/2100 MHz. Wireless communication device may include both a WLAN RF front end wireless transceiver subsystem 512 as well as a WWAN RF front end wireless transceiver subsystem 522 for communication in the shared communication frequency band 505. For example WLAN RF front end 512 may operate on Wi-Fi wireless radios in an example embodiment. In an additional example, WWAN RF front end 522 may operate on unlicensed WWAN wireless radios in the same unlicensed, shared communication frequency band in another aspect of the embodiment. In the example embodiment, wireless communication device 501 includes both unlicensed wireless radio frequency communication capabilities as well as licensed wireless radio frequency communication capabilities. For example, licensed wireless radio frequency communication capabilities may be available via a subscriber carrier wireless service. With the licensed wireless radio frequency communication capability, WWAN RF front end 582 may operate on a licensed WWAN wireless radio with authorization for subscriber access to a wireless service provider on a carrier licensed frequency band 507.

Wireless communication devices such as 501 may include wireless transceiver systems capable of transmitting with licensed wireless communication bands via a service provider such as under the 2.5G to 5G protocols discussed above. In some other aspects, wireless communication device 501 may not have any licensed wireless communication frequency capabilities through a carrier or otherwise and such devices may be referred to as standalone devices.

In the present example embodiment, wireless communication device 501 may include a shared antenna 560 for both WLAN/Wi-Fi as well as WWAN small cell unlicensed communications within the shared communication frequency band 505. In other embodiments, separate antenna systems may be utilized for transmission on different protocols but may not be necessarily arranged this way. Shared antenna 560 or separate antennas may transmit on a WLAN wireless link 561 in the unlicensed band and on a small cell WWAN wireless link 562 in the unlicensed band. In the present embodiment, wireless communication device 501 also shows a licensed wireless communication system for licensed WWAN wireless link via a separate antenna 581. Antenna 581 may communicate on a licensed WWAN wireless link 585.

Wireless links 561 and 562 may operate in the shared communication frequency band 505. Wireless link 585 may operate on a separate licensed communication frequency band 507. Data may be received from a remote data source such as a BTS (not shown) to wireless communication device 501 via a shared antenna 560 or via separate antennas for each unlicensed protocol in various embodiments as described. Similarly, data may be received from a remote data source such as a BTS (not shown) to wireless communication device 501 via antenna 581 for each licensed protocol in various embodiments as described.

Wireless communication device 501 may communicate data received from a source of data 518 including a device data master transmission queue. For example, the source data for transmission may be from a central processing unit or other processor in mobile information handling system 501. The data for transmission may be made via a number of wireless link routes to transmit requested data. In an example embodiment, selection of wireless link routes may be made in a smart connection context. For example, data transmission to a device may be routed via a bus 510 for transmission on a WLAN protocol such as Wi-Fi. Data may be transmitted to via bus 520 (which may be the same or a different bus structure) using a small cell unlicensed WWAN protocol. Data may also be transmitted via bus structure 580 using a small cell licensed WWAN protocol.

FIG. 5 further shows an embodiment where utilization of data queues may be used for a data scheduler system according to an embodiment. Data source 518 may include a master data queue before data is sent to each RF front end for transmission. Data queues 514, 524 and 584 may be utilized for concurrent operation of wireless links and data scheduling. Data queues 514, 524, 584 and the master data queue may be a memory such as a buffer memory or other type of memory storage device for temporary storage of data to be transmitted across wireless links 561, 562, and 585. In an example embodiment, data queue memory may include available RAM, such as DRAM, solid state memory, or another fast response memory for purposes of data scheduling.

Wireless communication device 501 may receive data to 518 via a number of wireless link routes to obtain requested data. For example, data transmission to device 501 may come in via a wireless link 561 and a WLAN protocol such as Wi-Fi. Data may be transmitted to wireless communication device 501 via wireless link 562 using a small cell unlicensed WWAN protocol. Data may also be transmitted to wireless communication device 501 via wireless link 585 using a small cell licensed WWAN protocol. Wireless link 561 and 562 may operate in the shared communication frequency band 505. Wireless link 585 may operate on a separate licensed communication frequency band 507. Data to be received at a data source 518 of wireless communication device 501 may be received via a shared antenna 560 or via separate antennas for each unlicensed protocol in various embodiments as described.

In one aspect of the present embodiment, the wireless communication device 501 may transmit data via a data scheduler system. In the event of transmission via a WLAN wireless protocol front end 512 and a small cell WWAN wireless protocol front end 522 via a shared unlicensed communication band 505, data queues for each wireless communication protocol may be used. A WLAN/Wi-Fi queue 514 is shown in FIG. 5 and may be used to schedule data on the shared communication radiofrequency band 505 concurrently used with the unlicensed small cell WWAN protocol in an embodiment. Similarly, a small cell WWAN queue 524 is shown in FIG. 5 and may be used to schedule data on the shared communication radiofrequency band 505 concurrently used with the WLAN/Wi-Fi protocol by the wireless communication device 501 in another aspect of the present embodiments. WLAN/Wi-Fi queue 514 and small cell WWAN queue 524 may be used as a data scheduler for data scheduling for transmissions from the wireless communication device 501 in the shared, unlicensed communication band in some embodiments as described further herein. As described, a data scheduler may be used to prevent collisions if the two protocols wireless links of WLAN 561 and unlicensed small cell WWAN 562 used by the wireless communication device 501 operate on the same channel or to reduce interference if the two protocols concurrently operate on adjacent channels. Data scheduling may utilize transmission timing to allow transmission across a same channel wireless link or adjacent channel wireless links concurrently, but may avoid simultaneous transmission which would create collision or interference. Round-robin, modified round-robin, or data prioritization scheduling may be used between the concurrently operating wireless link protocols as described in example embodiments herein.

In another aspect of the present embodiment, the wireless communication device 501 may receive data instead of transmit data. In one embodiment of FIG. 5, a remote data source such as a BTS may also utilize a data transmission queue for the purposes of data transmission scheduling as a way of regulating received data within the shared communication frequency band 505. This may be useful to remediate interference caused by use of a shared antenna or nearby antennas in the wireless communication device 501 when the two available unlicensed wireless link protocols may receive wireless data.

For example, available wireless link protocols for concurrent operation may include WLAN 561 and unlicensed small cell WWAN 562. Data may be stored in queue at remote data source such as at a BTS transmitting data may be scheduled depending on whether active transmission is occurring on the same channel or an adjacent channel within the shared communication frequency band 505. In the case of same channel usage by the two protocols, data scheduling from a remote data source such as a BTS transmitting on a shared communication frequency band 505 may remediate collision risk. In the case of adjacent channel usage by the two available protocols, data scheduling at remote data source may mitigate interference during simultaneous reception along the two active protocols, such as the WLAN 561 and the unlicensed small cell WWAN 562, to the wireless communication device 501. In an aspect, remote data source may utilize a control channel connection to determine from among a plurality of wireless protocols to transmit data along wireless links, for example 561 and 562 or even 585, from the remote data source or sources such as a BTS thus potentially increasing bandwidth to wireless communication device 501.

Figure 6:
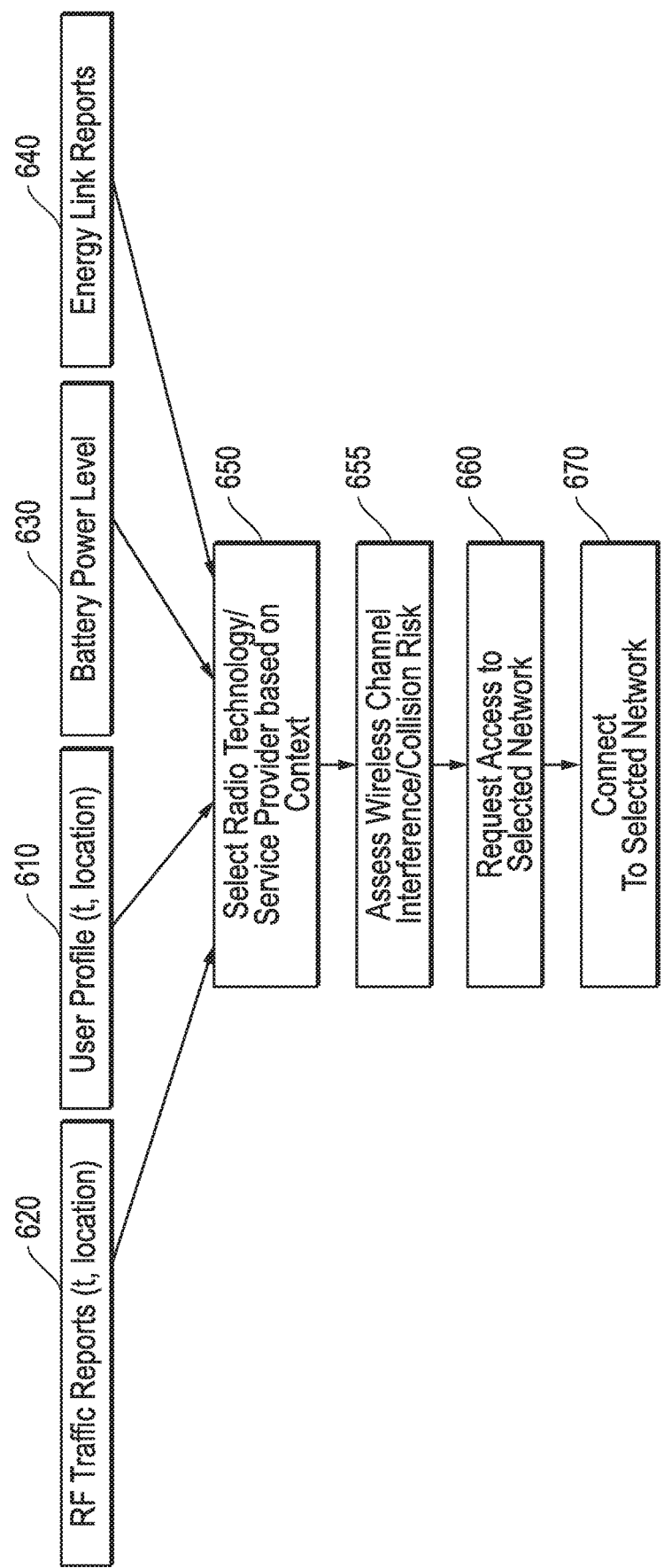
FIG. 6 is a block diagram illustrating a context aware radio resource management system according to an embodiment of the present disclosure.

FIG. 6 shows a context aware radio resource management system including a concurrent wireless link optimization system for connection by a user wireless communication device via an optimized wireless communication path according to an embodiment of the present disclosure. The context aware radio resource management system including a concurrent wireless link optimization system may be implemented in connection with a context aware radio resource management used in selecting a network and technology within a wireless network for a given location. In some example embodiments, the concurrent wireless link optimization system may be used to eliminate wireless links (e.g., wireless link pairs in concurrent operation) or to adjust down the ranking of wireless links likely subject to high interference or collision for consideration by the context aware radio resource management system during selecting one or more optimal wireless links. The context aware radio resource management system including a concurrent wireless link optimization system selects a plurality of wireless links for concurrent operation on a mobile information handling system wireless communication device. The wireless communication device in an embodiment may be a device having local wireless capability in unlicensed shared communication bands as well as carrier wireless capability on licensed wireless communication bands. The context aware radio resource management system may select wireless links from protocols in unlicensed communication bands or may select one or more wireless links in a licensed wireless communication band. In the case of a licensed WWAN wireless link, in emerging 5G technology the licensed WWAN wireless link may serve as an anchor link and have available supplemental bandwidth via an unlicensed WWAN wireless link. As described, this unlicensed WWAN wireless link has low cost and potentially high availability and QoS but may operate on a shared communication frequency band with other unlicensed wireless link protocols such as WLAN Wi-Fi. Accordingly, a concurrent wireless link optimization system may determine interference or collision risks from concurrently operating wireless link protocols in a shared communication frequency band.

In one example embodiment, the context aware radio resource management system may determine a selection or list of optimized wireless link options in a wireless neighborhood before the concurrent wireless link optimization system portion will determine local interference between concurrent wireless link pairs. In another example embodiment, the concurrent wireless link optimization system portion will determine local interference between concurrent wireless link pairs before assessing a list of optimized wireless links for communication via the remaining operation of the context aware radio resource management system. It can be appreciated as well that determination of potential interference of concurrent wireless links at a user wireless communication device may also be assessed simultaneously with other factors of the context aware radio resource management system in affecting rankings of available wireless links in the wireless neighborhood.

In a particular embodiment, the concurrent wireless link optimization system may determine interference or same channels operation of two or more WLAN or small cell WWAN protocols in a wireless neighborhood. The concurrent wireless link optimization system of the context aware radio resource management system may further determine what to do about a determined high level of interference or potential for collision. In one embodiment, the concurrent wireless link optimization system may opt to bar selection of same channel concurrent wireless link operation or adjacent channel concurrent wireless link operation from user wireless communication device. In the case of a mobile information handling system having an anchor licensed WWAN link with a supplementary unlicensed WWAN link in the shared frequency band, the context aware radio resource management system including a concurrent wireless link optimization system may select to shut down the unlicensed WWAN link option and default to the anchor licensed WWAN link for concurrent operation with the WLAN wireless link. In other aspects, the concurrent wireless link optimization system may opt to switch to a different channel given sufficiently good wireless quality and other factors for selecting a different channel in the shared frequency band for either the WLAN or an unlicensed WWAN links. In yet another aspect, the concurrent wireless link optimization system may allow same channel or adjacent channel concurrent wireless link operation but implement interference or collision mitigation to reduce the effects of anticipated interference.

As described, the context aware radio resource management system of the present disclosure may utilize crowd-sourced feedback on QoS for wireless network connections or various links within the networks. FIG. 6 shows an example embodiment of operation of the context aware radio resource management system including a concurrent wireless link optimization system in determining an optimized list of available wireless links. An example context aware radio resource management system is disclosed in several patent applications and issued patents of the same assignee. Additionally, factors and wireless network data relating to the context aware radio resource management system may be utilized by the context aware radio resource management system including a concurrent wireless link optimization system in providing end-to-end scores and selection of preferred wireless communication devices and preferred wireless communication paths between those preferred devices for a user and/or a recipient. Selection of two or more optimized wireless links for concurrent operation may be automatically by the context aware radio resource management system including a concurrent wireless link optimization system in some embodiments. In an embodiment, the selection by the context aware radio resource management system including a concurrent wireless link optimization system may be made with an override option available to a user. In yet another embodiment, the context aware radio resource management system including a concurrent wireless link optimization system may present an advisory graphical user interface including wireless link quality ratings to provide a user an informed choice of concurrent wireless links. Alternatively, the context aware radio resource management system including concurrent wireless link optimization may assist in selection among optimal wireless communication devices and an optimal wireless communication path via concurrent wireless links for a communication type by a user mobile information handling system.

Several factors are assessed by the context aware radio resource management system including a concurrent wireless link optimization system and its coordination with a context aware radio resource management method in selecting a radio technology for a wireless communication path and wireless communication devices. A software agent may be deployed at a wireless communication device or elsewhere in the network for executing the context aware radio resource management system including a concurrent wireless link optimization system and aspects of the context aware radio resource management system.

The context aware radio resource management system including a concurrent wireless link optimization system may further utilize the software agent to access wireless communication device usage trend data 610. The context aware radio resource management system including a concurrent wireless link optimization system may detect and learn patterns of usage by an individual user or recipient for particular wireless communication types. In an example embodiment, a preference score may be assigned to each as a percentage of time spent utilizing a particular wireless communication type or as a percentage of instances of using a particular wireless communication type. This data may be stored for a user or recipient in a wireless communication device usage trend database and shared across an enterprise or group via a context aware radio resource management system including a concurrent wireless link optimization system manager in certain aspects. In an example embodiment, wireless communication device usage trend data for a user or recipient is shown below in Table 1. The data may be relevant to a particular time of day during which wireless access is sought.

TABLE 1

| Communication Type | User | Device | Preference Score |
|---|---|---|---|
| SMS Text | User A | Smart Phone | 20% |
| Video conference | User A | Smart Phone | 5% |
| Voice call | User A | Smart Phone | 30% |
| IM | User A | Smart Phone | 15% |
| Web/App data | User A | Smart Phone | 30% |
| SMS Text | User B | Notebook | 0% |
| Video conference | User B | Notebook | 15% |
| Voice call | User B | Notebook | 10% |
| IM | User B | Notebook | 20% |
| Web/App data | User B | Notebook | 65% |
| SMS Text | User C | Tablet | 0% |
| Voice call | User C | Tablet | 10% |
| Video conference | User C | Tablet | 20% |
| IM | User C | Tablet | 20% |
| Web/App data | User C | Tablet | 50% |

It is understood that the wireless communication device usage trend data may vary widely depending on data collection of a user's trends. The wireless communication device usage trend data may begin with certain default levels and be adjusted over time as usage data is collected for wireless communication types. It is noted that in the above example embodiment the usage preference scores sum to 100% for each wireless communication device type and user. The listing of data communication types may be further granulated in some embodiments and the above is a generalized example of user trend data gathered by data communication types. For each communication type event, the time or number of instances of the communication type with a wireless communication device is divided into total time or number of instances of all communication types for a user in the example embodiment. The above values are example data meant for the purposes of illustration. Further, this data may be specific to time of day or location and be available in spatial-temporal profiles of a user or of a mobile information handling system. Additional criteria may be implemented and may alter the scoring from adding to 100% depending on the scoring system used in other embodiments as is understood by those of skill.

The usage preference score may serve as a weighting factor for usage rating that may impact which wireless link quality ratings are used to determine an optimized list of wireless links or wireless communication paths and selection of preferred wireless links for devices for a user, a recipient, or both. The usage preference score is associated with the wireless communication device and communication type. An additional factor that may be added to the usage preference score is cost. In an embodiment, use of technologies with extremely low cost such as unlicensed communication band wireless links including Wi-Fi, small cell WWAN, or peer to peer protocols such as Wi-Fi Direct or Bluetooth Peer-to-Peer as a communication paths may increase usage preference scores due to low cost. Cost may also be considered as part of the wider list ranking of optimized wireless links available for the wireless communication devices. Other example alterations to usage preference scores are contemplated as well including preferences expressed via a user interface by a user or recipient for a particular wireless communication link or path. These may shift the usage preference score of one or more available wireless communication devices. The shift may be by any amount. In one example embodiment, the expressed preference may shift the usage preference score for that wireless communication device by up to 50%. In another embodiment, a low cost option may shift a usage preference score by a similar amount if the wireless link QoS is sufficient. As understood, any shift in preference percentage or assigned weighting factor may be applied in the design of the context aware radio resource management system in various embodiments.

In another example embodiment, the context aware radio resource management system software agent obtains other user profile data that may also be utilized by the context aware radio resource management system including a concurrent wireless link optimization system that may shift user preference scores for wireless communication devices. Such user profile data may be included with the wireless communication device usage trend data 610 and may be used in connection with the context aware radio resource management system including a concurrent wireless link optimization system for tracking user trends for wireless communication types. In an example embodiment, the user profile data from the context aware radio resource management system may establish an approximate cyclostationary usage pattern of each wireless communication device on a daily or weekly basis. The time of day, location, types of usage, and usage percentages during a sample time interval are example factors included in the user profile data. This user profile data also may include a confidence of the estimate. This may be a statistical measurement of a mean and standard deviation for a set of data. Alternatively, the confidence of estimate may involve a goodness of fit metric to an expected set of values. Alternative statistical analysis may be performed on the user profile data to provide a confidence of the estimate. These cyclostationary usage patterns may used to shift weighting the preference scores in view of anticipated usage or future availability of wireless communication devices based on time of day and location or predicted location in a wireless neighborhood as described. The shifting of usage preference scores may be by any amount depending on several factors. Cost, expressed preference for wireless link, and other factors may shift user profile data that contributes to device usage trend data.

The context aware radio resource management system including a concurrent wireless link optimization system may also receive wireless link radio frequency broadband traffic reports 620 and may be in accordance with time and location data for a user or recipient and their associated wireless communication devices. In an example embodiment, the wireless link radio frequency broadband traffic reports 620 may be retrieved from the context aware radio resource management system. For location and time, available radio technologies and, where relevant, available service providers may be listed for a wireless communication neighborhood. The reports contain data relating to location, time and a radio frequency profile of given radio technologies for the available service providers. Certain radio technologies, such as those subject to concurrent wireless link operation, may not specifically be associated with a service provider such as in the case of Wi-Fi/WLAN, small cell WWAN, or similar wireless network connection options. These concurrent wireless links operate in unlicensed, shared spectrum as described. Small cell unlicensed WWAN wireless links may have a tandem licensed WWAN wireless link via a carrier communication bands in other example embodiments. For mobile information handling systems that are not standalone and have carrier wireless link capabilities on licensed frequency bands, both licensed and unlicensed wireless link options may be assessed.

The radio frequency profile data may also include an associated confidence of estimate for link ratings or QoS scores. The wireless link radio frequency profile may combine recent reports, historical traffic reports, as well as data measured via an active device radio frequency scan. In an example embodiment, to minimize wireless communication device battery power consumed, radio frequency broadband traffic reports from the network may only be requested or sent when a service provider network or a wireless communication device detects a significant change in signal quality or the network broker server detects that the local crowd source information is out of date.

The wireless link radio frequency broadband traffic report for wireless links partially comprises a spatial-temporal radio frequency profile for the wireless links. The systems begins with a baseline report available from a context aware radio resource management system. The context aware radio resource management system may determine QoS metrics for various wireless links from crowd sourced data received from a plurality of wireless communication device operating within a wireless neighborhood. Data may include several factors of wireless QoS measured or sourced to the context aware radio resource management system.

Key performance indicators (KPI) comprise a spatial-temporal radio frequency profile. Data such as received signal strength (RSSI), signal-to-noise ratios (SNR), or signal to interference ratios (SIR) may be relevant channel quality indicators in a KPI matrix. Other data, may include data throughput speeds, communication latencies, jitter, and packet loss measurements. The context aware radio resource management system may actively assess the quality of wireless links being used. One or more of these performance indicators may be used to compute a link rating for a wireless link. Baseline reports rely on estimated values. For example using baseline estimated received signal strength indicators (RSSI), a link rating may be computed as follows in one embodiment:

Link Rating (i,j)=MAX(MIN(100%, (Estimated RSSI−Minimum Signal)/Max RSSI signal−Minimum RSSI signal, 0%), where i is a technology index and j is a wireless protocol index.

A maximum RSSI level may be defined in a technology protocol, for example as −70 dBm. The minimum RSSI level may be defined as well, for example at −110 dBm. RSSI is not the only key performance indicator that may be used to compute link ratings. Link rating may be based on different key performance indicator values besides received signal strength. Alternatively, multiple key performance indicator values may be used in the computation of a link rating.

In other examples of KPIs that may be used for link rating, link capacity and bit error rates (BER) may be measured. Bit error rate is the ratio of error bits to total bits sent across a wireless link. It is a metric illustrating a signal to noise ratio which can define the quality of a radio connection for a wireless link. A bit error rate may be a comparison of a sent test stream of data by a transmitter with what is received by a receiver. The bit error rate can be tested by a bit error rate tester in software which transmits a known bit pattern to or from the mobile information handling system. Pre-error correction errors are counted. A signal-to-interference ratio may also be measured. Such a measurement is based on the power levels for signal transmission (e.g., per bit) relative to interference levels in the received signal. Packet error rate, signal-to-noise measurement, or other signal quality testing is also contemplated. Data packets, such as test packets or active data, may be monitored as it is sent across wireless links to determine packet loss frequencies or resend occurrences for the packets.

A link rating matrix is established by available link protocols and may be broken down by wireless technology, service provider, or both. In an example embodiment, for a matrix of [WLAN 2, WLAN 3, Small Cell WWAN, WWAN 4, ATT 4G, Verizon 4G], the baseline Link Rating (j) computation may result in (70%, 80%, 95%, 90%, 50%, 50%). 100% indicates best signal link quality and 0% indicates a signal quality below a minimum acceptable level. The context aware radio resource management system may use the link rating scores to evaluate the optimal wireless service providers and available protocols for the anticipated usages for a wireless link that comprises a portion of an end-to-end wireless communication path. Thus, the link rating protocol matrix can assist in selecting wireless links and a service provider with the best scores.

The context aware radio resource management system operating on a wireless communication device may scan for wireless link mobile broadband traffic reports fitting a time and location zone for operation. In an example embodiment, the zone of operation may be a wireless neighborhood as described above. Wireless link mobile broadband traffic reports may be retrieved from a central server database in the wireless networks. Alternatively they may be located elsewhere in a database such as at a network broker server system. The baseline report may be supplemented or superseded by any fresh or historical mobile traffic reports to assist in selecting a service provider and protocol. Recent or historic radio frequency profiles for time period and location zone may be used to update or supplement the wireless link mobile broadband traffic reports. More recent data may be of greater relevance however. For example, the link ratings in a radio frequency profile may utilize recently measured RSSI values instead of estimated values.

Mobile broadband traffic reports are aggregated via crowd sourcing. They may be categorized by location zone and have time and date stamps to identify freshness. Crowd sourcing of information will enhance the availability of accurate data for location zones and times of wireless communication device operation. For example, if a wireless communication device makes a request for a fresh mobile broadband traffic report, the central server database may have reports from other wireless communication devices with recent timestamps. Alternatively, the central server database may make a request for a recent mobile broadband traffic report from wireless communication devices in the same location. Whether via recent storage in the central database or via a recent request of fresh crowd sourced mobile broadband traffic reports, such a report may avoid the need for the wireless communication device to conduct a radio frequency scan itself.

Crowd sourcing mobile broadband traffic reports for locations and times provides a higher chance that a current mobile broadband traffic report for a location is available. It also increases the available data points providing greater certainty and reliability of data. Part of the benefit of crowd sourcing may also involve performing a hysteresis analysis on the data coming from multiple wireless communication devices to determine trends in wireless link selection. When a wireless link is reported having low traffic and good radio frequency conditions, traffic from systems using the context aware radio resource management system will elect that wireless link. If a large part of the crowd of wireless communication devices begin to pile onto whichever wireless link is reported to have the best available bandwidth, that link will slow down and underperform. The mobile broadband traffic reports account for this by conducting a hysteresis analysis. If a large number of users begin to select this wireless link, then the method for generating mobile broadband traffic reports accounts for this traffic and alters the recommended wireless links. For example, a second best option may be recommended as optimal for traffic and radio frequency conditions instead. Each crowd sourced mobile broadband traffic report identifies its selected link. A count of these selections can be compared to a threshold rate level of selections for a given link. If the rate of selections exceeds the threshold for a link, then the recommendation may be altered.

If there are not enough reliable historical mobile broadband traffic reports recent enough to base a wireless link assessment upon, the context aware radio resource management system may initiate a wireless communication device radio frequency scan. This scan collects data regarding possible wireless links. This radio frequency scan consumes power and processor resources so should be used sparingly, however it provides up-to-date key performance indicators (KPI) for a new radio frequency profile to be used in a mobile broadband traffic report. Based upon this new mobile broadband traffic report, the system provides a wireless link performance profile to be used by the context aware radio resource management system.

The scan or test of radio frequency links may be conducted by the context aware radio resource management system. As a first measure, received signal strength and bandwidth availability for a service provider and a protocol are determined. Then a test of radio frequency data capacity is made. This can test upload and download performance for each service provider and protocol. For example, a standard test data volume may be sent via a wireless link to a server location at the service provider. Similarly, a test data volume may be received from a server location by the wireless communication device via the wireless link. Latency of response, upload and download speed or throughput can then be measured for the service provider and protocol. The data is associated with a location zone and stamped with a time and date. The type of transmitter/receiver or wireless communication device may also be recorded. This data set provides a wireless link radio frequency profile that may become part of a mobile broadband traffic report. Upon measuring this data for a location, the report may be shared or published by the context aware radio resource management system from the mobile information handling system.

In one embodiment, the wireless link assessment may be used by the context aware radio resource management system including a concurrent wireless link optimization system to determine a ranked list of wireless communication links available within a wireless neighborhood. Further assessment may include determining a ranked list of available wireless communication links for communication along a wireless communication path between two points across the wireless communication network, including various steps or hops across links within the wireless communication network. Using user profile reports and radio frequency link reports, each wireless communication link may be given an overall rank.

For a ranking of wireless communication path end-to-end, several methods may be used to determine wireless communication path overall quality score or. In one example embodiment, it may be assumed the wireless communication path is only as good as the lowest link rating score along that path. Thus, the wireless communication path rating may be determined as the same as the minimum link rating in the communication path. In another embodiment, the wireless communication path rating may take into account the diminished quality of each wireless link in the communication path that is rated at less than 100%, or a perfect rating for a link. Thus a calculation whereby the effect of each wireless link rating less than 100% determines some diminishment on the overall wireless communication path rating. In an example embodiment, the wireless communication path rating may be determined as a product of a wireless link rating of the connecting link for the user wireless communication device with the wireless link rating of the connecting link for the recipient wireless communication device as follows:

Wireless Communication Path Rating (j)=(Link Rating for Link from Wireless Device A*Link Rating for Link from Wireless Device B), where j=communication path index.

For a wireless communication path=[AT&T® 3G for Device A, Verizon® 4G for Device B], an example user Wireless Communication Path Rating (j) calculation may result as follows, (90%*70%)=63%. Each wireless communication path for a user wireless communication device and a recipient can be ranked by this score. Each Link Rating used to determine the Wireless Communication Path Rating shows a quality of service score by protocol for a service provider at a location and time. For a given communication path, the Wireless Communication Path Rating may serve as an initial end-to-end quality rating upon which selection of a wireless communication path may be made by the pan device communication optimization system. The Wireless Communication Path Rating may also include additional wireless links and Link Ratings for those links along the path. Additional weighting factors may apply to the initial end-to-end quality rating to yield modified end-to-end ratings for wireless communication links for selection of wireless communication paths and user and recipient wireless communication devices. This is described further below. The above values serve only as an example for purposes of discussion.

In another aspect, energy link reports 640 may be received as a variation of the wireless link radio frequency broadband traffic reports 620. These energy link reports 640 contain data relating to time, location and radio frequency profile information similar to the radio frequency broadband traffic reports. In addition, measurements of energy consumed during use of a specified wireless link for a specified wireless service type is reported. The energy link data profile matrix can provide more detailed information above the mobile broadband radio frequency traffic reports. In this embodiment, the context aware radio resource management system prepares and delivers an energy link consumption report. The energy link consumption report provides data on power consumed by a wireless communication device while performing certain tasks on a wireless link at a location. Energy link consumption reports contain data indicating how many joules of energy are consumed during sending SMTP emails, sending SMS messages, conducting voice communications, video conferencing, IM, accessing internet services, streaming audio or video, or other uses of mobile information handling systems. This data amounts to another key performance indicator (KPI) in addition to capacity or link quality data for a wireless link. The context aware radio resource management system can measure and utilize some or all data such as link capacity, link quality, and energy consumption in determining preferred wireless links. Link ratings may be calculated similarly to the above description using the additional link energy consumption data. As with other input factors, a confidence of estimate associated with this data may be included. The energy link report data 640 may combine recent energy link profiles, historical energy link reports, and measurements through wireless communication device scans during operation.

The context aware radio resource management system including a concurrent wireless link optimization system may access battery power level data 630 for user wireless communication devices. In an example embodiment, the context aware radio resource management system including a concurrent wireless link optimization system may access the battery power level data 630 via the context aware radio resource management system which receives battery power level data from an intelligent battery management system of the wireless communication devices in the system. The battery power level input may establish thresholds for certain wireless communication protocols as being too costly in terms of power based on the remaining battery power available. Below a defined battery level threshold, the context aware radio resource management system may disable the most advanced protocols to save energy. For example, with only 10% battery power remaining, the context aware system may recommend to a user to disable high power consuming protocols such as 4G or 5G. The option may be given to the user, or automatic shut down of the radio frequency subsystem may take place. In a further example, the context aware system may recommend or shut down 3.5G at 5% remaining battery power. Any threshold levels may be set to trigger recommended shut down. In such a shut down, that wireless link rating will be at 0% or disconnected and impact the communication path overall ratings and the wireless communication device rating by the context aware radio resource management system including a concurrent wireless link optimization system of the present disclosure.

In another embodiment, the battery power level data 630 may also be implemented directly by the context aware radio resource management system including a concurrent wireless link optimization system as another factor in consideration of end-to-end scores for wireless communication paths and for user or recipient wireless communication devices. For example, if a user wireless communication device such as a mobile smart phone is at a battery power level below a certain threshold, this may reduce the end-to-end scores for wireless communication paths involving that user wireless communication device. This is especially true for certain wireless communication types such as video conferencing or voice calls. In an example embodiment, the context aware radio resource management system including a concurrent wireless link optimization system may include battery power levels for available wireless communication devices associated with users or recipients as a power weight score for the wireless communication devices and associated links in the communication path. The power weight score for each wireless communication device weights the link ratings for those devices and modifies the initial end-to-end score determination for wireless communication paths involving the wireless communication devices with battery power level data available.

The context aware radio resource management system including a concurrent wireless link optimization system accesses the wireless communication device usage trend data 610 and receives the wireless link radio frequency broadband traffic reports 620, battery power level data 630, and in some energy link reports 640.

Turning to 650, the context aware radio resource management system including a concurrent wireless link optimization system determines wireless communication link scores for available wireless links within the wireless neighborhood. In some embodiments, end-to-end scores for available wireless communication paths between available user wireless communication devices and available recipient wireless communication devices are generated at 650. The context aware radio resource management system including a concurrent wireless link optimization system may determine a list of ranked wireless links available within a wireless neighborhood in some embodiments. In other embodiments, the context aware radio resource management system including a concurrent wireless link optimization system may establish a plurality of available wireless links that meet a minimum sufficient level of criteria of QoS, power consumption, cost, or other factors in view of contextual usage of the wireless communication device.

The above data and inputs may be assessed by the context aware radio resource management system including a concurrent wireless link optimization system determine one or more preferred wireless communication links for a user wireless communication device at 650. In an example embodiment, one or more optimized wireless links may be determined at for a mobile information handling system in either one or more unlicensed communication frequency bands, licensed communication frequency bands, or a combination of both. In a further aspect, a plurality of wireless link options are determined for concurrent operation to enable greater communication bandwidth and reliability. In some embodiments, the plurality of optimized wireless links best suited for a data usage may be concurrently operating wireless links in an unlicensed, shared communication frequency band. With respect to the cost factor in particular, unlicensed, shared communication frequency band selection may result from the analysis of the context aware radio resource management system. Further, WLAN and small cell WWAN wireless links in unlicensed bands may be available and have good wireless QoS due to proximity and availability of a local wireless neighborhood in some aspects of the present embodiments.

In one aspect, the above data and inputs may be assessed by the context aware radio resource management system including a concurrent wireless link optimization system determine one or more preferred wireless communication end-to-end paths for a user wireless communication device at 650. In an example embodiment, the end-to-end rating for wireless communication paths begins by selection of a user wireless communication device (Device A) and a recipient wireless communication device (Device B). This end-to-end rating may include use of a plurality of concurrent wireless links.

In determining optimal wireless links, scanning assessment may be made of available wireless communication options for communication between Device A and Device B. If a low cost connection such as Bluetooth Peer to Peer, WLAN, Small Cell WWAN, or Wi-Fi Direct options are available and have sufficient capacity and signal quality, such a selection may be made. However, such wireless connections may also be included in the context aware radio resource management system including a concurrent wireless link optimization system assessment of all end-to-end communication paths with multiple wireless path links.

Assessment of communication paths between user wireless communication device (Device A) and a recipient wireless communication device (Device B) will include additional available network path options on various communication technologies and may include concurrently operating wireless links for use in shared communication frequency bands. The context aware radio resource management system including a concurrent wireless link optimization system estimates an end-to-end link quality score for each wireless connection path between Device A and Device B as described above. In an example embodiment, the context aware radio resource management system including a concurrent wireless link optimization system may access the context aware radio resource management system to determine the wireless Link Ratings from Device A to an available network and Link Ratings from a back-end wireless network to Device B. Link Ratings may also be determined for any number of intermediate hops or links along the wireless communication path being assessed. The Link Ratings may be determined from wireless link radio frequency broadband traffic reports 620 as discussed above. An end-to-end quality score is estimated from the above Link Ratings for one or more alternative service providers and technologies for wireless communication paths between Device A and Device B. Additionally, the end-to-end quality scores for wireless communication paths are similarly estimated between one or more user wireless communication devices and one or more recipient wireless communication devices. An aggregation of end-to-end quality scores involving a user wireless communication device may indicate an initial assessment of a preferred user wireless communication device before usage trends for communication types are assessed. For example, the Link Rating for wireless link connection between Device A and a wireless network technology may be combined with the Link Rating for the connection between Device B and the same or different wireless technology that form the end-to-end wireless communication path between Device A and Device B. For wireless communication paths with multiple wireless hops or links, the product of the plurality of the Link Ratings may be used to arrive at an initial end-to-end quality score for the end-to-end wireless communication path. In another embodiment, the lowest Link Rating of among the wireless links in the end-to-end wireless communication path may be adopted as the end-to-end quality score. It is understood that the wireless communication path may span across multiple service providers or wireless technologies.

Similarly, preferred recipient wireless communication devices may be initially assessed as preferred based on estimated end-to-end quality scores associated with that wireless communication device. As is discussed further, the initial end-to-end estimated quality scores are modified by battery power data and by user preference data to yield final end-to-end ratings. Other modifications to end-to-end ratings may also be implemented. The context aware radio resource management system including a concurrent wireless link optimization system may present an advisory graphical user interface including final end-to-end quality ratings to provide a user an informed choice of optimal wireless communication devices and an optimal wireless communication path for communication via a communication type between a user and a recipient as explained. The end-to-end quality ratings may include the final end-to-end scores or scores for individual wireless devices and may appear similar to that shown in Table 2. In other embodiments, the advisory graphical user interface including end-to-end quality ratings may include a more qualitative rating for wireless devices, providers, or technologies for wireless communication paths between a user and a recipient. In an example embodiment, an end-to-end quality rating such as "good," "better," or "best" may be used. Each qualitative end-to-end rating may be assigned a end-to-end quality score range in an example implementation. It is understood that other qualitative indicators are also contemplated for use with the an advisory graphical user interface including final end-to-end quality ratings.

In an example embodiment, battery power levels 630 for wireless communication devices may be applied to initial end-to-end quality estimations to yield updated end-to-end quality rating for wireless communication paths. Such a battery power level may be applied as a multiplier weighting factor to the initial end-to-end quality estimations. In an embodiment, the new adjusted end-to-end score=Initial end-to-end quality estimation*Power weight score (Device A)*Power weight score (Device B). The power weighting score is assigned as a percentage. For example, above a threshold battery power level for a device (e.g., 40%), the power weight score may be set at 100%. Below the threshold battery power level, the power weight score decreases to 0% for a device power level at a second lower threshold power level (e.g., 5%). It is understood that any threshold levels may be used in establishing the power weighting score index with reported battery power levels for the wireless communication device. In a further example, the power weight score of 100% may be assigned for device power levels above 50% battery capacity remaining. The power weight score index line may linearly drop 100% to zero for device power levels between 50% and 10%. It is understood that any power weight score index curve relating to the device power level may be applied. Further, for a wireless communication path involving multiple hops and devices, a power weight score may be applied for each device along the wireless communication path if applicable.

In yet another embodiment, the battery power levels and user preference scores may be applied to alter the initial end-to-end quality estimation scores. In an example embodiment, the new adjusted end-to-end score=Initial end-to-end quality estimation*Preference score (Device A, Communication type, Cost)*Power weight score (Device A)*Preference score (Device A, Communication type, Cost)*Power weight score (Device B).

The assessments described above for end-to-end quality estimation scores may be applied on one side only, for example for Device A or Device B only, to determine link ratings for those devices on one side only in some embodiments. It is understood that the wireless link rating assessments with respect to only one device, such as Device A, may yield a list of wireless link ratings for that mobile information handling system according to embodiments herein. In some aspects, data for a recipient wireless communication device, such as Device B, may not be relevant if data is accessed on a server or other hardwired network device or such data may not be available for a recipient device. In other aspects, implementation of assessment of the entire end-to-end path including the recipient device may not be desired. In such example embodiments, assessment may be made according to the above examples for a single mobile information handling system to rate wireless links available to that mobile information handling system and may further be made for concurrent operation of a plurality of wireless links.

Proceeding to 655, the context aware radio resource management system including a concurrent wireless link optimization system will assess the available optimized wireless link options for local interference. In an embodiment, the wireless communication device may concurrently operate two or more wireless links to increase bandwidth or for additional wireless link availability. As described herein, that concurrent operation of two or more wireless links may arise in shared radiofrequency communication bands in some embodiments. For example, concurrent wireless links may operate in the unlicensed U-NII band which may be shared by WLAN/Wi-Fi and emerging 5G small cell WWAN systems. With competing wireless link protocols operating concurrently on shared communication frequency bands, interference may arise due to BTS transceivers operating on the same channels or adjacent channels within these shared communication frequency bands. For example, wireless neighborhoods such as depicted in FIG. 3 may be set up without particular determination of channels that each BTS transceiver operates on. Thus, a wireless communication device communicating concurrently with multiple transceivers, from a shared antenna in some embodiments, may encounter interference from operating on adjacent channels or even the same channel within the shared communication frequency band. The context aware radio resource management system includes a concurrent wireless link optimization system to determine if available wireless link pairs may be such that they would concurrently operate on adjacent or even the same channel in a shared communication band. The concurrent wireless link optimization system will receive data relating to neighboring interference lists for various available concurrent wireless links.

Other aspects of interference may be assessed as well at 655. In addition to interference at a mobile information handling system due to concurrent wireless links operating there, interference may be experienced at BTSs in the wireless neighborhood. Interference at the BTSs includes interference from other APs and small cell transceiver substations. BTS interference may occur due to deployment of several protocols within a shared communication frequency band. BTS interference may further depend in part on proximity of BTS devices transmitting within a shared communication frequency band. Assessment of this interference may be determined or modeled and impact the selection of concurrent wireless links operating if operating within a shared communication frequency band. In an example embodiment, total risk of interference or collisions due to concurrently operating wireless links may be assessed at the mobile information handling system as well as at the selected BTSs at 655 to determine or optimize concurrent wireless links.

Based on the channels occupied by potential wireless links pairs, an assessment may be made of collision or interference potential. The interference may be based on modeled interference from adjacent channel operation or may be measured by the concurrent wireless link optimization system through the network interface subsystem. In response to determination of potential significant interference or risk of collision, some concurrent wireless link pairs may be eliminated from consideration among a list of ranked wireless links available within a wireless neighborhood in some embodiments that meet a minimum sufficient level of criteria of QoS, power consumption, cost, or other factors in view of contextual usage of the wireless communication device. In other embodiments, the concurrent wireless link optimization system may impact the ranking of potential concurrent wireless pairs from the determined risk of collision risk or interference due to concurrent operation at a wireless communication device.

In yet another aspect, which may be encountered within the context of a wireless communication device that has both licensed and unlicensed wireless communication options, the context aware radio resource management system may determine to not concurrently operate transceivers in the shared communication frequency band, for example, to entirely avoid data collision. For example, the mobile information handling system switch off an unlicensed WWAN wireless link option and leave only an anchor WWAN wireless link option via a service provider. In such a situation, that risk of collision or significant interference may result in an election not to operate concurrent wireless links in the shared communication band or to prohibit selection of a pair of concurrent wireless links that operate on the same channel.

As yet another aspect, the concurrent wireless link optimization system may deploy interference or collision mitigation to minimize or avoid potential collision or interference for a selected pair of wireless links. For example, interference mitigation may include applying adaptive bandpass filtering or data transceiver scheduling for concurrently operating pairs of wireless links that may operate on the same or adjacent channels in the same frequency band if such wireless link pairs are to be selected for concurrent operation.

At 660, the context aware radio resource management system including a concurrent wireless link optimization system selects one or more preferred wireless communication links or paths based on comparison of the optimized wireless link rating scores including adjustments made due to the interference or collision assessment made via the concurrent wireless link optimization system. The context aware radio resource management system including a concurrent wireless link optimization system assesses usage trends, interference of concurrently operating protocols on shared communication frequency bands, RF traffic reports, battery power levels, energy link reports, and additional factors, such as subscriber cost of wireless link usage, to establish wireless link or end-to-end wireless path ratings for the wireless communication device. As with other factors, subscriber cost or settings may influence the determination by weighting protocol options and influence the scoring described above. In an example embodiment, it may be used as a multiplier or other weighting factor in determining end-to-end ratings or scores for wireless communication paths. Alternatively, settings or subscriber cost may be used to mask out protocol options altogether. For example, cost or battery energy power levels may mask out protocol options or wireless communication devices in some embodiments. Due to these factors of cost as well as power consumption, in may arise that a plurality of wireless links may be selected from the available WLAN and small-cell WWAN options in a wireless neighborhood. In some embodiments, these WLAN and small cell WWAN links are often available at no cost, and their close proximity yields lower connection requirements and transmission power costs. Based on one or more of the above-outlined aspects, the context aware radio resource management system including a concurrent wireless link optimization system selects a plurality of available wireless links while avoiding local interference or implementing interference mitigation due to operation on same or adjacent channels within the unlicensed, shared radiofrequency communication bands used with WLAN and WWAN. In some aspects, the concurrent wireless link optimization system may disable unlicensed WWAN links defaulting to anchor licensed WWAN wireless links for concurrent operation with a WLAN when a same channel would otherwise be used. In yet other embodiments, unlicensed WWAN may be disabled in favor of licensed WWAN wireless links for concurrent operation when adjacent channels would otherwise be selected.

At 670, the context aware radio resource management system including a concurrent wireless link optimization system may utilize a software agent to initiate communication of the selected communication type on the concurrent wireless links. In another example, types of communication may be commenced along a preferred wireless communication path between a user wireless communication device and a recipient wireless communication device in an embodiment of the present disclosure. In doing so, preferences of wireless communication device based on usage trends for a wireless communication type are taken into account in selecting either concurrent wireless link to conduct the communication. This is done in accordance with determining the preferred wireless communication links while minimizing interference or collision risk during concurrent operation by the user wireless communication device.

The request is made for access to the selected network to establish the wireless communication link. In some embodiments, the mobile information handling system operating concurrent wireless links may establish connection to each of a selection of unlicensed wireless links in a shared communication frequency band. For example, connection may be made with a WLAN AP and with a small cell WWAN substation including exchange of any necessary security access information. In another embodiment, the radio frequency subsystems of a wireless adapter may contain individual subscriber identity module (SIM) profiles for each technology service provider and their available protocols as well as a wireless access system for WLAN and similar wireless connections for any wireless links that are subscriber specific. The radio frequency subsystems may have an application processor or controller for the wireless adapter capable of switching between SIM profiles or WLAN or similar wireless network connections at the wireless communication device. Thus, a wireless link recommendation from a context aware radio resource management system including a concurrent wireless link optimization system and a context aware radio resource management system would not need to be transmitted to network broker server system, but may be selected with a SIM profile for a recommended service provider and protocol and seek direct access. Alternatively it could be submitted to a network broker server systems such as an MVNO. Nonetheless, billing and other coordination of SIM profile options may be managed by a broker such as an MVNO. The context aware radio resource management system including a concurrent wireless link optimization system and context aware radio resource management system is described further below.

Figure 7:
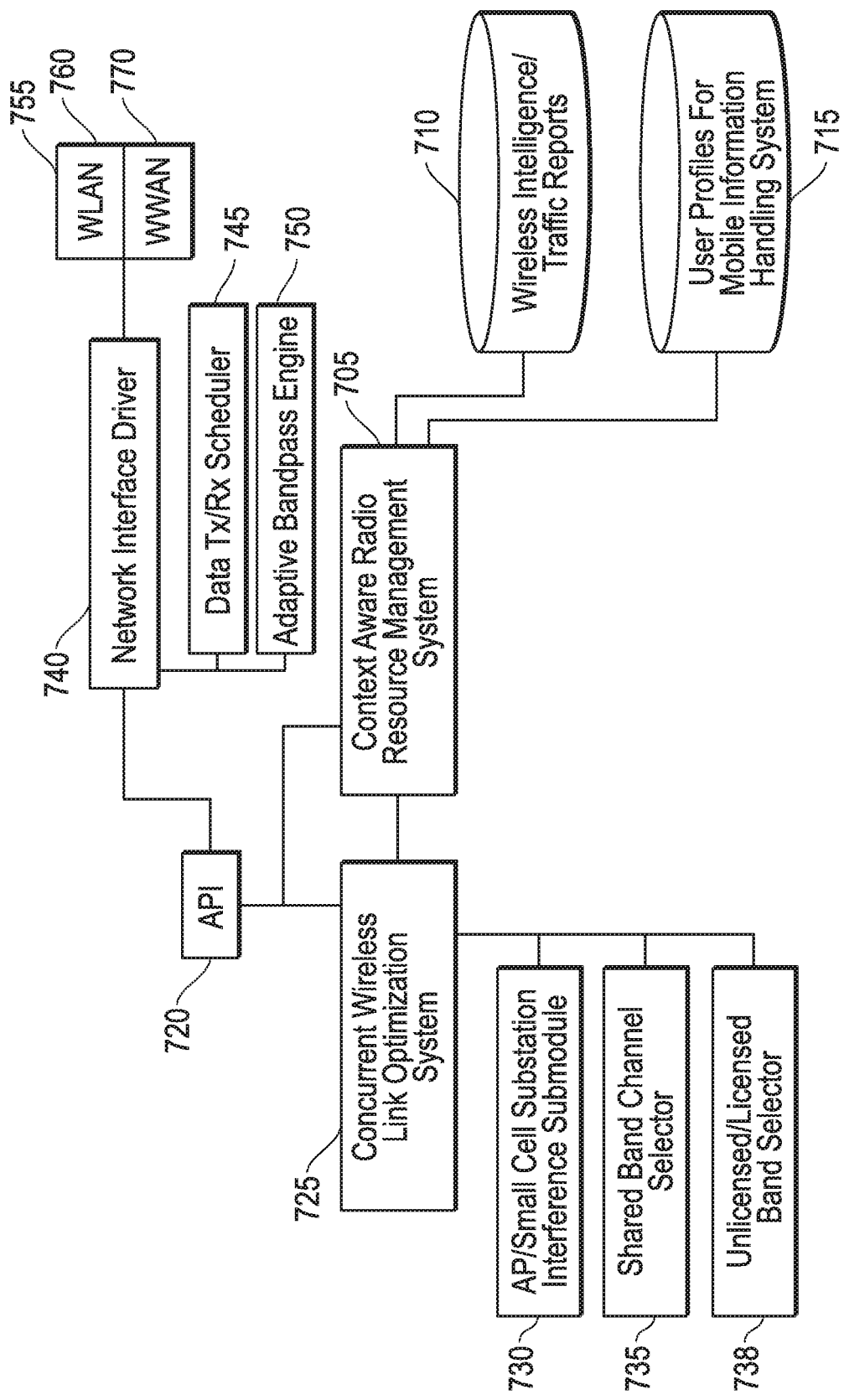
FIG. 7 is a block diagram illustrating a context aware radio resource management system including a concurrent wireless link optimization system according to an embodiment of the present disclosure.

FIG. 7 illustrates the context aware radio resource management system including a concurrent wireless link optimization system according to several embodiments of the present disclosure. The context aware radio resource management system 705 includes a concurrent wireless link optimization system 725 that works in connection with and may be part of the context aware radio resource management system 705. Some aspects of the context aware radio resource management system 705 are described in several embodiments in U.S. Pat. Nos. 9,088,859, 9,119,039, 9,210,714, 9,167,591 as well as several applications to the same assignee and incorporated herein by reference. The context aware radio resource management system 705 with the concurrent wireless link optimization system 725 may reside on a remote data center or may reside on a user information handling system. Portions may reside on the mobile information handling systems which seek to potentially access a plurality of concurrent wireless links. For example the concurrent wireless link optimization system 725 with aspects of the context aware radio resource management system 705 may operate within a software agent residing at the wireless communication device. Other portions of the context aware radio resource management system 705 may operate at a remote data center or a server located elsewhere.

The context aware radio resource management system 705 may have access to databases including wireless intelligence reports and traffic reports 710. Additional variations of databases available to the context aware radio resource management system 705 are discussed above and may include energy link reports, wireless link cost data and the like. Further, context aware radio resource management system 705 may also have access to user profiles 715 for the mobile information handling systems that operate as the wireless communication devices. Again, additional data may be available to the context aware radio resource management system 705 including battery power level readings, measurements of real time radio frequency QoS factors among other factors described herein or understood by those of skill.

In a distributed system where code instructions may operate on several processors, context aware radio resource management system 705 may work with components and modules via an application programming interface (API) 720 as understood by those of skill in the art. For example, coordination of code instruction modules may coordinate operation via API 720 as between the context aware radio resource management system 705 and code portions such as the concurrent wireless link optimization system 725. API 720 may further facilitate coordinated operation with a network interface driver 740, where appropriate, in a wireless communication device such as a mobile information handling system of the types described herein.

The context aware radio resource management system 705 with the concurrent wireless link optimization system 725 may include an AP/small cell substation interference module 730 executing code instructions to determine channels and interference levels from concurrently operating wireless link pairs in a wireless neighborhood. A neighboring interference list may be generated by determining the channels on which detected APs and small cell WWAN wireless links are operating. Based on operation of the AP/small cell substation interference module 730, a determination of likely interference or potential collision due to adjacency of channels or same channel operation may be assessed. From such an assessment, determination may be made regarding whether to select a different available channel or to implement interference remediation.

In some embodiments, a shared communication frequency band channel selector may be used to select a different wireless link option for concurrent operation of multiple wireless links at a wireless communication device such as a mobile information handling system. The shared band channel selector 735 may be implemented to determine a non-adjacent channel option for either of the one or more wireless protocols to be concurrently operating. The shared communication frequency band channel selector may further opt to select alternative channels for either the WLAN or small cell WWAN wireless link when a same channel occupancy is detected in some embodiments. In yet other embodiments, it may be desired to forgo all concurrent wireless link operation if the only choice is a same channel option between two wireless links. In such a situation, the context aware radio resource management system may shut down the concurrent wireless link capability. It is understood however that other options may be implemented as well including data scheduling or other collision or interference mitigation as described in embodiments herein. In some aspect, the mobile information handling system may seek to preserve concurrent wireless link capability to expand bandwidth or provide for backup wireless link options should a primary wireless link option become poorly connected or disconnected.

In some embodiments, a mobile information handling system may include both licensed and unlicensed wireless capabilities. For example, a mobile information handling system may have available an anchor licensed small cell WWAN capability as well as an unlicensed, supplemental small cell WWAN option. The unlicensed, supplemental WWAN option may operate in a shared communication frequency band as under the present disclosure and may provide for low-cost additional wireless bandwidth. In such an example embodiment, the concurrent wireless link optimization system 725 may be operatively connected to an unlicensed/licensed band selector 738. The unlicensed/licensed band selector 738 may be used to turn off a supplemental unlicensed WWAN wireless link when a high risk of collision or interference is determined. In doing so, a system with both licensed and unlicensed WWAN capability will default to the licensed WWAN option. The licensed WWAN option may then operate concurrently with a WLAN wireless link operating in the shared, unlicensed communication frequency band according to various embodiments herein.

Network interface driver 740 may be connected to a wireless network interface device 755. Wireless network interface 755 device may operate with a shared antenna or multiple antennas for transceiving data and communications via the concurrent wireless links. The wireless network interface device 755 may operate, in an example embodiment, with a WLAN radiofrequency front end 760 for transceiving wireless data via a WLAN wireless link such as Wi-Fi. In another example embodiment, emerging 5G systems may implement small cell WWAN operation (e.g., eNodeB operations) utilizing shared communication frequency spectrum. In an example embodiment, the small cell WWAN operation may have a tandem anchor licensed small cell WWAN radio and a supplemental small cell WWAN radio operating in the shared, unlicensed communication band. Accordingly, a wireless network interface device 760 may also operate with a WWAN radio frequency front end 770 for transmission and reception of wireless data and communication from a small cell WWAN wireless link that may be both a licensed small cell WWAN wireless link and an unlicensed small cell WWAN wireless link. The context aware radio resource management system 705 and concurrent wireless link optimization system 725 may select to utilize or turn off unlicensed small cell WWAN wireless link availability for concurrent operation with the WLAN link. Selection to keep on or turn off the unlicensed small cell WWAN link may depend on assessed risk of collision or interference according to an example embodiment. In one embodiment, a licensed, small cell WWAN radio may operate via the same or a different antenna system according to embodiments herein and may operate on a different communication frequency band from the unlicensed, shared communication frequency band used by the WLAN wireless link.

Network interface driver 740 may include a processor or controller executing code instructions for an interference or collision remediation system according to embodiments of the present disclosure. In an example embodiment, network interface driver 740 may execute code instructions for a data transmission/receiver scheduler 745. In one embodiment, a memory for queuing data may reside with code instructions for scheduling data transmission as between concurrently operating wireless links in a shared communication frequency band. One or more memory devices may be available for queuing data for the plurality of concurrently operating wireless links. For example, a WLAN queue and a small cell WWAN queue may be made available for data transmission scheduling. A data reception scheduler may also be implemented in an embodiment. In some aspects, data reception may be scheduled by transmitting requests to queue data at a BTS transmitter to limit occupancy of a channel for the wireless link.

In another example embodiment, network interface driver 740 may execute code instructions for operation of an adaptive band-pass filter 750. In one embodiment, when adjacent channels are selected for concurrent operation of wireless links, the band-pass filter applied to delineate channels may be further programmable to provide sharper delineation between the adjacent channels. Such sharper application of band-pass filtering may be conducted according implementation of band-pass filter systems of higher order than are frequently used to delineate channels in a DSP of a network interface for a wireless link protocol. The adaptive band-pass filter will reduce noise bleed over between adjacent channels caused by roll of from the ends of a channel frequency range. The adaptive band-pass filter may be implemented according to embodiments herein and as band-pass filter operation is understood by those of skill in the art.

It is understood that the block diagram of FIG. 7 may include additional components and aspects that may not all be depicted for the context aware radio resource management system 705 including a concurrent wireless link optimization system 725. Additional aspects and components including various processors, memories, busses may be utilized and the context aware radio resource management system 705 including a concurrent wireless link optimization system 725 may be a distributed system operating across multiple information handling systems according to some embodiments. Further, not all aspects of the context aware radio resource management system 705 including a concurrent wireless link optimization system 725 may be utilized in all embodiments.

Figure 8:
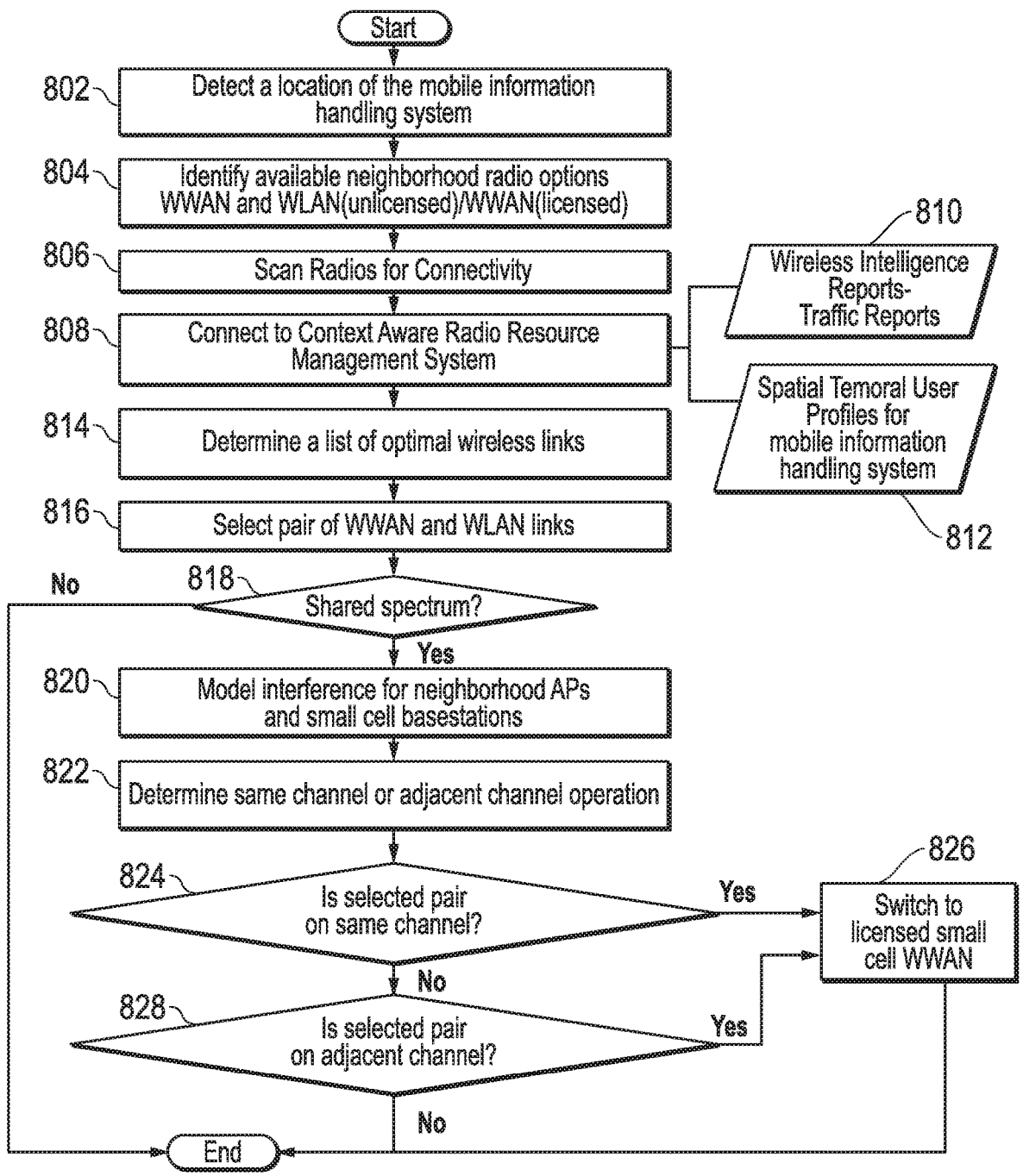
FIG. 8 is a flow diagram illustrating a method of determining an optimized communication link via a wireless network using a concurrent wireless link optimization system according to an embodiment of the present disclosure.

FIG. 8 illustrates a method for determining a plurality of concurrent, optimal wireless links according to an embodiment. In this example embodiment, one or more wireless links may be available to a user in a wireless neighborhood as described above. Additionally, the mobile wireless communication device may utilize one or more wireless links for communication. In an example embodiment, a mobile wireless communication device may concurrently use two wireless links on a shared radiofrequency communication band. For example, a mobile wireless communication device may utilize WLAN and an unlicensed small cell WWAN wireless links within the shared, wireless communication band. In other aspects, the mobile information handling system communicating concurrently on a plurality of wireless links may also have available to it one or more licensed options via small cell WWAN wireless links on licensed communication bands through subscriber or other access to the wireless service carrier communication bands. In one example embodiment, the LTE-LAA protocol may be used whereby an unlicensed small cell WWAN wireless link option is a supplemental WWAN wireless link made available in tandem with an anchor licensed small cell WWAN wireless link made available through a wireless service provider network.

The method of FIG. 8 may be executed via code instructions for a context aware radio resource management system including a concurrent wireless link optimization system on one or more processors or controllers. It is understood that each of the following steps may be performed by the context aware radio resource management system including concurrent wireless link optimization system software at the mobile wireless communication devices, at a remote location in whole or in part, or some combination of the same. For purposes of the presently described embodiment, examples of the elements of the context aware radio resource management system including a concurrent wireless link optimization system may be described for explanation purposes.

At 802, the system may detect a location of the mobile information handling system that will communicate wirelessly. The location may be determined via a number of methods understood by those of skill in the art. For example, a global positioning system (GPS) may determine a longitude and latitude reading for the wireless communication device as understood by those of skill in the art. GPS may be available as a feature of the mobile communication device or may be a software application operating on the mobile information handling system. Additional location techniques may be network based via multilateration such as via interpolation of signals between base station signal antennas such as APs or signal towers for either small cell applications or wider applications in some embodiments. An example may be triangulation via advanced forward link trilateration. Another example is utilization of Wi-Fi positioning system (WPS) for a mobile information handling system within a wireless neighborhood in other embodiments. WPS may utilize RSSI and fingerprinting via APs to locate relative position to the APs. Handset based location systems determining signal strengths or cell location or an Enhanced Observed Time Difference (E-OTD) system may be used in yet other embodiments.

At 804, the concurrent wireless link optimization system of the context aware radio resource management system will scan or determine available neighborhood radio WLAN options as well as any unlicensed, small cell WWAN options and other optional wireless links based on reported location of the mobile information handling system. Several shared radiofrequency communication bands may be available. In an example embodiment, wireless neighborhood options may include WLAN and unlicensed, small cell WWAN options operating on the U-NII communication band at around 5 MHz. The unlicensed, small cell WWAN option may be a supplemental WWAN wireless link to an anchor, licensed, small cell WWAN wireless link option in some aspects. In an example embodiment, the licensed small cell WWAN wireless link may operate under a wireless protocol such as 4G LTE-LAA or equivalents in emerging 5G technology. The context aware radio resource management system including a concurrent wireless link optimization system will determine based on location of the mobile information handling system a list of APs and WWAN small cell base stations available in a neighborhood where the mobile information handling system is located. Additional wireless links not operating in a shared frequency spectrum may be assessed as optional wireless links as well. For example, the WWAN small cell base stations may include options that operate in both the shared, unlicensed communication frequency band as well as those that may operate in a different licensed communication frequency band.

At 806, the mobile information handling system may scan radios to determine or confirm which WLAN, small cell WWAN for both licensed and unlicensed operation, or other options are online or available. The context aware radio resource management system including a concurrent wireless link optimization system may amend wireless neighborhood options that will be assessed for optimization as well as interference based on the scan of radios for available connectivity.

Proceeding to 808, the context aware radio resource management system including a concurrent wireless link optimization system may access databases remotely for access to resources or data stored there or, optionally, other data stored locally at mobile information handling system. For example, the mobile information handling system may access portions of the context aware radio resource management system including a concurrent wireless link optimization system operating on remote servers to assist in determination of optimized wireless links at the mobile information handling system location in an embodiment. Further, in some example embodiments, crowd sourced data such as wireless intelligence traffic reports 810 may be sourced from remote databases at which this data is collected in some embodiments. Similarly, in an embodiment, wireless communication device usage trend data 812 may be accessed remotely for the mobile information handling system to assess a history of data or communication usage. This data may include detailed information such as spatial temporal user profiles that show usage for the mobile information handling system for locations, users, and based on time of day or day of the week. Spatial temporal user profiles may provide somewhat reliable wireless communication device usage trend data in some embodiments in that it may capture cyclostationary trends at various locations. Additionally, wireless intelligence reports 810 and wireless communication device usage trend data 812 as well as other relevant data to the context aware radio resource management system may be accessed from locally stored memory on the mobile information handling system. In an example embodiment, tracking and storage of wireless communication device usage trend data 812 may be stored locally on the mobile information handling system in some embodiments. It is contemplated that the context aware radio resource management system may be a localized or distributed system and data sources may be both local and remote.

Upon accessing wireless intelligence reports 810 and wireless communication device usage trend data 812, as well as other data such as described with respect to FIG. 6, the context aware radio resource management system including a concurrent wireless link optimization system may determine a set of optimized wireless links for communication at 814. In an example embodiment, the set of optimized wireless links may include WLAN and small cell WWAN links for concurrent communications on a shared communication frequency band. In many cases, the context aware radio resource management system may determine that WLAN or nearby small cell WWAN links operating within an unlicensed spectrum are highly ranked optimized link options due to cost, proximity, or availability.

In addition, the context aware radio resource management system may assess licensed, small cell WWAN links serving as an anchor WWAN wireless link. With a protocol such as LTE-LAA for example, the mobile information handling system may select between the unlicensed and licensed communication bands for small cell WWAN operation. The determination of optimal wireless links will include one or more communication frequency bands that are not shared and reside in a licensed spectrum in some aspects. The licensed communication bands may be available via subscriber or other access to a wireless service provider licensed WWAN network. The wireless service provider may provide a licensed small cell WWAN substation in the wireless neighborhood for use by the mobile information handling system. Several wireless links may similarly be assessed such as macrocell WWAN options, WiFi, WiGig, and other options depicted in embodiments herein. In some example embodiments, several service provider options may be available to the mobile information handling system as described herein. Assessment of the plurality of wireless link types, including the wireless links operating in the unlicensed, shared communication frequency bands, may be made by the context aware radio resource management system as well.

The context aware radio resource management system including a concurrent wireless link optimization system receives usage trend data relating to a common communication type used at the detected location and time of day. Upon doing so, the context aware radio resource management system including a concurrent wireless link optimization system will determine wireless communication device usage trends based on recorded data for usage of wireless communication devices for types of wireless communication recorded as usage preference score data. Similarly, expressed preferences and cyclostationary data relating to device use may be accounted for in the wireless device usage trend data and usage preference scores.

The context aware radio resource management system including a concurrent wireless link optimization system determines wireless communication device capabilities based on communication type. Several wireless communication device capabilities are determined. In example embodiments, the wireless communication device capabilities may include communication types available with a device, security access available to wireless systems, technology capabilities of transmitter systems, and service provider subscriptions associated with each wireless communication device. In some embodiments, smart battery management systems report battery power levels available for each of the wireless communication devices as part of the wireless communication device capabilities. Further device capabilities may also be assessed including current functions operating on the wireless communication devices that may impede or limit capabilities to operate within a communication type due to occupied RF capacity, limited processor capacity, or the like.

The context aware radio resource management system including a concurrent wireless link optimization system then will assess wireless link ratings of available wireless links. The wireless link ratings, as described in embodiments herein, reflect QoS/capacity scores for wireless links at a detected location or probable future locations based on predicted future path of the mobile information handling system. This QoS and capacity data may be received from crowd-sourced data or measured data in accordance with the disclosure herein. The context aware radio resource management system including a concurrent wireless link optimization system will also factor in the type of transmission likely from usage trend data to generate an initial determination of wireless links that meet a threshold criteria quality rating for the wireless communication type by the mobile information handling system. Ranking factors may be weighted by cost considerations and by power consumption considerations. Power consumption ratings may be derived from energy link reports that may be crowd sourced as well and accessed by the context aware radio resource management system. Cost may be a weighting factor in other aspects when determining wireless link ratings. In some example embodiments, no cost wireless links that meet a minimum criteria of QoS, capacity, or power consumption levels may be prioritized.

In one example embodiment, the context aware radio resource management system may determine a ranked list of optimal wireless links available in a wireless neighborhood. The ranking in the list of optimal wireless links may be affected by weighting factors as described herein. Ranked optimal wireless links will be required to meet at least a minimum threshold level of QoS in one example embodiment. Weighting factors for determination of the ranked list of optimal wireless links may be established by a user or system administrator or may change dynamically. For example, weighting factors for power consumption may increasingly become relevant if the detected battery power levels fall to certain points.

In an example embodiment for energy consumption considerations, power weighting scores reflecting battery power capacity for the wireless communication devices associated with a user and reported power consumption levels for using available wireless links in energy link reports are applied. The power weighting scores may modify the wireless link quality ratings to update wireless link rating scores for each wireless link and with that may change list rankings. It is understood, the power weighting scores are but one example of weighting factors that may be applied.

At block 816, the mobile information handling system may be set up to utilize concurrent wireless links. In an example embodiment, the mobile wireless communication device will have subscriber capabilities with licensed and unlicensed WWAN communication protocols as described above to establish concurrent wireless links to enhance bandwidth. The concurrent wireless link optimization system of the context aware radio resource management system determines candidate pairs of concurrent wireless links from the list of optimal wireless links defined above. In an example embodiment, the mobile information handling system will set up concurrent wireless links from two protocols. For example, one WLAN wireless link and one small cell WWAN link may be the intended concurrent wireless link set up. The small cell WWAN link may have a low cost unlicensed WWAN component wireless link and an associated anchor, licensed WWAN wireless link option available. The concurrent wireless link optimization system will select a pair of candidate wireless links listed in the optimal wireless links for assessment of interference or data collision. In one example embodiment, the concurrent wireless link optimization system may select the two most highly rated wireless links initially. Due to cost and proximity consideration, the most highly rated wireless links may be both wireless links operating in unlicensed, shared communication bands. As the concurrent wireless link optimization system iterates through the potential concurrent wireless link pairs, it may select lower rated wireless link pairs with each iteration. It is understood however, selection of candidate pairs of concurrent wireless links may be selected in any order from the list of optimized wireless links in other embodiments. The concurrent wireless link optimization system will assess each pair of optimal wireless links to provide a localized interference rating for each pair. The interference rating may not overcome the quality rating for each individual wireless link in the pair, however a high risk of interference or data collision will reduce the rating of such a pair unless interference mitigation measures are implemented. As each pair is assessed it may be added to an interference ranking list of candidate concurrent wireless link pairs. In an example embodiment, the selected pair of wireless links include one WWAN and one WLAN wireless links.

At 818, for each candidate pair of concurrent wireless links, the concurrent wireless link optimization system determines if these wireless links are operating in shared radio frequency communication spectrum. If all possible pairs of concurrent wireless links are not operating in a shared radio frequency communication spectrum, then the process may end for interference assessment. Current radio communication in separate radio band operation does not create a risk of interference or collision during concurrent operation and thus there is no need for further interference mitigation.

If however, any candidate pair of concurrent wireless links would operate in a shared communication frequency band at 818, flow proceeds to 820. At 820, the concurrent wireless link optimization system will model or measure the potential interference between the selected pair of wireless links that are operating concurrently in the same band. In an example embodiment, potential interference or collision is measured or modeled based on the channels within the shared communication frequency band on which each concurrent wireless link would operate. In a particular embodiment, a determination may be made of the operating channels for each WLAN AP or small cell base station for WWAN in the selected pair of potential concurrent wireless links.

At 822, the concurrent wireless link optimization system will determine which channels in the shared communication frequency band that the candidate pair of potential concurrent wireless links will operate on. With this information it may discerned whether the candidate pair will operate on the same channel, which represents the greatest potential risk of collision/interference or on an adjacent channel which may raise some issue of local interference.

At 824, the concurrent wireless link optimization system will determine if the selected WLAN and unlicensed small cell WWAN pair would operate on the same channel. Same channel operation risk of collision or interference during concurrent operation on the mobile information handling system, and potentially via the same antenna in some embodiments, will cause flow to proceed to 826. At 826, based on the determination of whether a selected candidate pair of potential concurrent wireless links are on the same channel, the concurrent wireless link optimization system will select to turn off the unlicensed small cell WWAN radio capability. Since the mobile information handling system has capability for both an anchor licensed WWAN option as well as the supplemental unlicensed WWAN option that would operate on the same channel, turning off the unlicensed WWAN option would default to the licensed WWAN option instead. Operation of a concurrent wireless link on the licensed small cell WWAN wireless link would be via a different communication frequency band than the shared band utilized by the WLAN. Accordingly, risk of local interference due to same channel operation may be avoided.

If the selected pair of candidate concurrent wireless links are not operating on the same channel at 824, the concurrent wireless link optimization system will determine if the selected candidate pair will operate on adjacent channels at 828. Concurrent operation of wireless links on adjacent channels further represents some risk of radio interference as described herein. In the example embodiment, if the candidate pair of concurrent wireless links would operate on adjacent channels, flow proceeds to 826. As described above, the concurrent wireless link optimization system will select to turn off the unlicensed small cell WWAN radio capability if it would operate on an adjacent channel to the WLAN link in the candidate pair. Since the mobile information handling system has capability for both an anchor licensed WWAN option as well as the supplemental unlicensed WWAN option that would operate on the adjacent channel, turning off the unlicensed WWAN option would default to the licensed WWAN option instead. Operation of a concurrent wireless link on the licensed small cell WWAN wireless link would be via a different communication frequency band than the shared band utilized by the WLAN. Accordingly, the risk of local interference due to adjacent channel operation may be avoided. At this point the process may end.

The above example embodiment of FIG. 8 is not limited to concurrent wireless links that include one WLAN and one small cell WWAN wireless link. It is contemplated that two WLAN links, two small cell WWAN wireless links or other concurrent wireless links operating within a shared communication frequency band may be selected according to the above method. Further, the example embodiment of FIG. 8 refers to selection of potential pairs of concurrent wireless links, but it is contemplated that the above algorithm could be applied to trios of concurrent wireless links or an even greater set of wireless links desired for concurrent operation by a mobile information handling system. The algorithm of FIG. 8 may be applied by those of skill to a trio or greater number of concurrent wireless links for a mobile information handling system.

It is understood that the methods and concepts described in the algorithm above for FIG. 8 may be performed in any sequence or steps may be performed simultaneously in some embodiments. It is also understood that in some varied embodiments certain steps may not be performed at all or additional steps not recited in the above figures may be performed. It is also contemplated that variations on the methods described herein may also be combined with portions of any other embodiments in the present disclosure to form a variety of additional embodiments.

Figure 9:
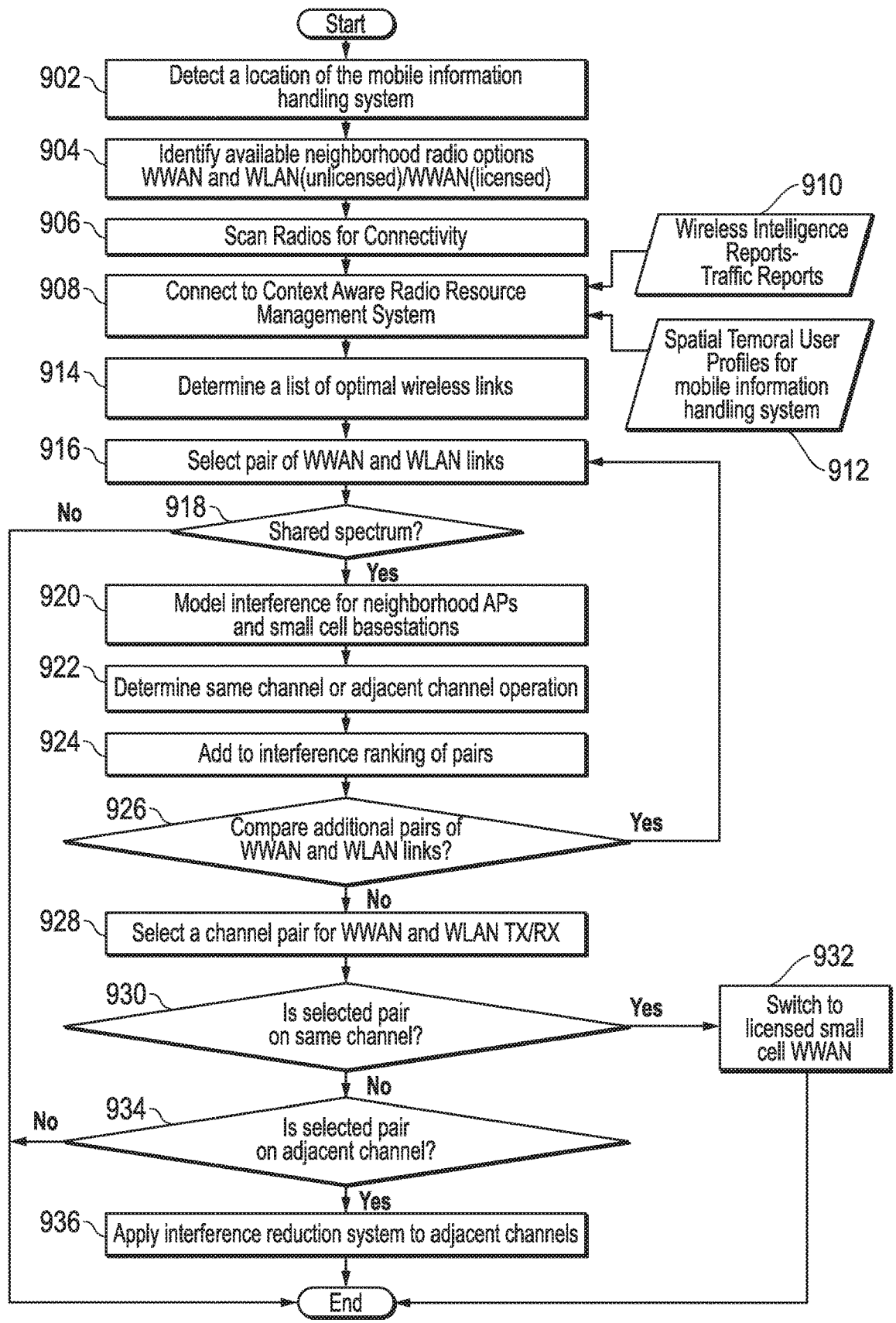
FIG. 9 is a flow diagram illustrating another method of determining an optimized communication link via a wireless network using a concurrent wireless link optimization system according to an embodiment of the present disclosure.

FIG. 9 illustrates a method for determining a plurality of concurrent, optimal wireless links according to another embodiment. In this example embodiment, one or more wireless links may be available to a user in a wireless neighborhood as described above. Additionally, the mobile wireless communication device may concurrently use two wireless links on a shared radiofrequency communication band. For example, a mobile wireless communication device may utilize WLAN and an unlicensed small cell WWAN wireless links within the shared, wireless communication band. In other aspects, the mobile information handling system communicating concurrently on a plurality of wireless links may also have available to it one or more licensed options via small cell WWAN wireless links on licensed communication bands. The licensed communication bands may be available through subscriber or other access. In one example embodiment, the LTE-LAA protocol may be used whereby an unlicensed small cell WWAN wireless link option is a supplemental WWAN wireless link made available in tandem with an anchor licensed small cell WWAN wireless link made available through a wireless service provider network.

The method of FIG. 9 may be executed via code instructions for a context aware radio resource management system including a concurrent wireless link optimization system on one or more processors or controllers that may be localized or distributed as described in embodiments herein.

At 902, the system may detect a location of the mobile information handling system that will communicate wirelessly. The location may be determined via a number of methods understood by those of skill in the art. For example, a global positioning system (GPS) may determine a longitude and latitude reading for the wireless communication device as understood by those of skill in the art. GPS may be available as a feature of the mobile communication device or may be a software application operating on the mobile information handling system. Additional location techniques may be network based via multilateration such as via interpolation of signals between base station signal antennas such as APs or signal towers for either small cell applications or wider applications in some embodiments. Various examples are described herein and may be used to determine location.

At 904, the concurrent wireless link optimization system of the context aware radio resource management system will scan or determine available neighborhood radio WLAN options as well as any unlicensed, small cell WWAN options and other optional wireless links based on reported location of the mobile information handling system. Several shared radiofrequency communication bands may be available, for example options in the U-NII communication band at around 5 MHz. The unlicensed, small cell WWAN option may be a supplemental WWAN wireless link to an anchor, licensed, small cell WWAN wireless link option in some aspects. In an example embodiment, the licensed small cell WWAN wireless link may operate under a wireless protocol such as 4G LTE-LAA or equivalents in emerging 5G technology. Based on location of the mobile information handling system, the context aware radio resource management system including a concurrent wireless link optimization system will determine a list of APs and WWAN small cell base stations available in the wireless neighborhood. Additional wireless links not operating in a shared frequency spectrum may be assessed as optional wireless links as well. For example, the WWAN small cell base stations may include options that operate in both the shared, unlicensed communication frequency band as well as those that may operate in a different licensed communication frequency band. Macrocellular and other wireless link options may also be assessed.

At 906, the mobile information handling system may scan radios to determine or confirm which WLAN, small cell WWAN for both licensed and unlicensed operation, or other options are online or available. The context aware radio resource management system including a concurrent wireless link optimization system may amend wireless neighborhood options that will be assessed for optimization as well as interference based on the scan of radios for available connectivity.

Proceeding to 908, the context aware radio resource management system including a concurrent wireless link optimization system may access databases remotely for access to resources or data stored there or, optionally, other data stored locally at mobile information handling system. For example, the context aware radio resource management system including a concurrent wireless link optimization system operating may determine optimized wireless links at the mobile information handling system location in an embodiment. Further, in some example embodiments, crowd sourced data such as wireless intelligence traffic reports 910 and wireless communication device usage trend data 912 may be accessed remotely for the mobile information handling system to assess a history of data or communication usage in determination of wireless link ratings. This data may include detailed information such as spatial temporal user profiles that show usage for the mobile information handling system for locations, users, and based on time of day or day of the week. Spatial temporal user profiles may provide somewhat reliable wireless communication device usage trend data in some embodiments in that it may capture cyclostationary trends at various locations.

Upon accessing wireless intelligence reports 910 and wireless communication device usage trend data 912, as well as other data such as described with respect to FIG. 6, the context aware radio resource management system including a concurrent wireless link optimization system may determine a set of optimized wireless links for communication at 914. In an example embodiment, the set of optimized wireless links may include WLAN and small cell WWAN links for concurrent communications on a shared communication frequency band. In many cases, the context aware radio resource management system may determine that WLAN or nearby small cell WWAN links operating within an unlicensed spectrum are highly ranked optimized link options due to cost, proximity, or availability.

In addition, the context aware radio resource management system may further assess licensed, small cell WWAN links serving as an anchor WWAN wireless link. With a protocol such as LTE-LAA for example, the mobile information handling system may select between the unlicensed and licensed communication bands for small cell WWAN operation. The determination of optimal wireless links will include one or more communication frequency bands that are not shared and reside in a licensed spectrum instead in some aspects. The licensed communication bands may be available via subscriber or other access to a wireless service provider licensed WWAN network. The wireless service provider may provide a licensed small cell WWAN substation in the wireless neighborhood for use by the mobile information handling system. Several wireless links may similarly be assessed such as macrocell WWAN options, WiFi, WiGig, and other options depicted in embodiments herein. In some example embodiments, several service provider options may be available to the mobile information handling system as described herein. Assessment of the plurality of wireless link types, including the wireless links operating in the unlicensed, shared communication frequency bands, may be made by the context aware radio resource management system as well. The context aware radio resource management system including a concurrent wireless link optimization system may determine link ratings for various available wireless links in the wireless neighborhood according to various described embodiments herein. An example determination of optimized wireless links may be found with respect to the descriptions of FIG. 6 for example to determine QoS ratings as weighted by cost or power consumption considerations as well as other factors.

In one example embodiment, the context aware radio resource management system may determine a ranked list of optimal wireless links available in a wireless neighborhood. The ranking in the list of optimal wireless links may be affected by weighting factors as described herein. Ranked optimal wireless links will be required to meet at least a minimum threshold level of QoS in one example embodiment. Weighting factors for determination of the ranked list of optimal wireless links may be established by a user or system administrator or may change dynamically.

At block 916, the mobile information handling system may be set up to utilize concurrent wireless links. In an example embodiment, the mobile wireless communication device will have subscriber capabilities with licensed and unlicensed WWAN communication protocols as described above to establish concurrent wireless links to enhance bandwidth. The concurrent wireless link optimization system of the context aware radio resource management system determines candidate pairs of concurrent wireless links from the list of optimal wireless links defined above.

In an example embodiment, the mobile information handling system will set up concurrent wireless links from two protocols. For example, one WLAN wireless link and one small cell WWAN link may be the intended concurrent wireless link set up. The small cell WWAN link may have a low cost unlicensed WWAN component wireless link and an associated anchor, licensed WWAN wireless link option available. The concurrent wireless link optimization system will select a pair of candidate wireless links listed in the optimal wireless links. The candidate wireless link pair is assessed for risk of interference or data collision. In one example embodiment, the concurrent wireless link optimization system may select the two most highly rated wireless links initially. Due to cost and proximity consideration, the most highly rated wireless links may be both wireless links operating in unlicensed, shared communication bands. As the concurrent wireless link optimization system iterates through the potential concurrent wireless link pairs, it may select lower rated wireless link pairs with each iteration. It is understood however, selection of candidate pairs of concurrent wireless links may be selected in any order from the list of optimized wireless links in other embodiments. The concurrent wireless link optimization system will assess each pair of optimal wireless links to provide a localized interference rating for each pair. The interference rating may not overcome the quality rating for each individual wireless link in the pair, however a high risk of interference or data collision will reduce the rating of such a pair unless interference mitigation measures are implemented. As each pair is assessed it may be added to an interference ranking list of candidate concurrent wireless link pairs. In an example embodiment, the selected pair of wireless links include one WWAN and one WLAN wireless links.

At 918, for each candidate pair of concurrent wireless links, the concurrent wireless link optimization system determines if these wireless links are operating in shared radio frequency communication spectrum. If all possible pairs of concurrent wireless links are not operating in a shared radio frequency communication spectrum, then the process may end for interference assessment. Current radio communication in separate radio band operation does not create a risk of interference or collision during concurrent operation and thus there is no need for further interference mitigation.

If however, any candidate pair of concurrent wireless links would operate in a shared communication frequency band at 918, flow proceeds to 920. At 920, the concurrent wireless link optimization system will model or measure the potential interference between the selected pair of wireless links that are operating concurrently in the same band. In an example embodiment, potential interference or collision is measured or modeled based on the channels within the shared communication frequency band on which each concurrent wireless link would operate. In a particular embodiment, a determination may be made of the operating channels for each WLAN AP or small cell base station for WWAN in the selected pair of potential concurrent wireless links.

At 922, the concurrent wireless link optimization system will determine which channels in the shared communication frequency band that the candidate pair of potential concurrent wireless links will operate on. With this information it may discerned whether the candidate pair will operate on the same channel, which represents the greatest potential risk of collision/interference or on an adjacent channel which may raise some issue of local interference. The concurrent wireless link optimization system will determine if the candidate pair of potential concurrent wireless links will operate on the same channel, which represents the greatest potential risk of interference at 922. If the selected pair of candidate concurrent wireless links are not operating on the same channel, the concurrent wireless link optimization system will determine if the selected candidate pair will operate on adjacent channels, which represents some risk of radio interference.

Based on the determination of whether a selected candidate pair of potential concurrent wireless links are on the same channel or adjacent channels, a pair interference rating is provided and compared to other available pairs of candidate concurrent wireless links at 924. This pair rating will be added to an interference ranking of candidate concurrent wireless links from the list of optimal wireless links.

As described, it is often the case that wireless link ratings are preferable for WLAN or small cell WWAN wireless links if available in the wireless neighborhood. However, when a pair of potential concurrent wireless links will operate on the same channel within a shared communication frequency band, the risk of collision and interference is increased. Accordingly, such a candidate pair may receive a poor interference rating. Similarly, measurement or modeling may show that adjacent channel pairs of concurrent wireless links are also subject to higher potential interference due to concurrent operation from the same mobile information handling system and in some embodiments the same antenna. Accordingly, these adjacent channel candidate concurrent wireless link pairs may receive a lower rating than concurrent wireless links operating on non-adjacent channels. It may be the case however that the only unlicensed spectrum options available or of sufficient quality within a wireless neighborhood within range of a mobile information handling system are on the same or adjacent wireless channels. If so, selection of a same-channel or adjacent pair may still occur by the context aware radio resource management system including concurrent wireless link optimization.

At decision block 926, the concurrent wireless link optimization system determines if additional pairs of candidate concurrent wireless links are to be assessed from the list of optimized wireless links determined from above. If so, flow proceeds back to 916 to select another pair of candidate concurrent wireless links for interference assessment. If not, flow proceeds to 928.

At 928, the concurrent wireless link optimization system will select a channel pair of concurrent wireless links for communication. In an example embodiment, the selected pair of concurrent wireless links may be from a WLAN protocol (Wi-Fi) and from a small cell WWAN protocol (eNodeB). The selected channel pair of concurrent wireless links are determined based on a combination of QoS rating for optimal links as described above relative to the interference rating and its impact on that QoS rating for the pair.

The selection of the pair of concurrent wireless links may be made according to several factors. The concurrent wireless link optimization system may disallow same channel operation in some embodiments. In such embodiments, another concurrent wireless link pair must be selected. Alternatively, concurrent operation of wireless links may be shut down if only same channel operation is available.

In other example embodiments of selecting concurrent wireless link pairs from the rated list of optimal wireless link pairs, the concurrent wireless link optimization system may elevate pairs without adjacent channel operation above those with slightly higher QoS or other optimization rating on adjacent channels to avoid adjacent channel interference in other example embodiments. However, in some embodiments the concurrent wireless link optimization system may be left with same channel or adjacent channel concurrent wireless link pairs having far superior QoS ratings than for other pairs. Selection is made depending on how much impact a determination of same channel or adjacent channel operation will have. This may further depend on the interference mitigation measures available. A pair of concurrent wireless links may be selected for communication according to which pair has the highest combined QoS or other optimization ratings, but also that pair with the lowest potential interference or probability for data collision.

In some example embodiments, a balance is struck by determining a threshold level of difference between QoS or other combined optimization rating between available concurrent wireless link pairs above which an adjacent channel pair may be tolerable relative to the lower combined QoS rating of a non-adjacent pair in one example embodiment. Similarly, another balance may be struck by determining a threshold level of difference between QoS or other combined optimization ratings between available concurrent wireless link pairs at which a same channel pair may be tolerable relative to a lower combined QoS rating at a non-same channel pair in another example embodiment. In some embodiments, the tolerance threshold level may be the same level for both. In other embodiments, the tolerance threshold levels may be different for adjacent channels and same channel concurrent operation. For example, the tolerable difference in combined QoS optimization level of a non-same channel pair may be a substantially larger difference in that a lower QoS level may be tolerable compared to the option of selecting the same channel concurrent wireless link pair.

At 930, the concurrent wireless link optimization system will determine if the selected WLAN and unlicensed small cell WWAN pair would operate on the same channel. Same channel operation risk of collision or interference during concurrent operation on the mobile information handling system is potentially high. In some embodiments, concurrent operation may be via the same antenna. If the selected pair would operate on the same channel in the unlicensed communication band, flow proceeds to 932. At 932, the concurrent wireless link optimization system will select to turn off the unlicensed small cell WWAN radio capability. As described above, since the mobile information handling system has capability for both an anchor licensed WWAN option as well as the supplemental unlicensed WWAN option, turning off the unlicensed WWAN option would default to the licensed WWAN option instead. Operation of a concurrent wireless link on the licensed small cell WWAN wireless link would be via a different communication frequency band than the shared band utilized by the WLAN. Accordingly, risk of local interference due to same channel operation may thereby be avoided. The mobile information handling system may set up concurrent wireless links on the WLAN in the shared communication band and on the licensed small cell WWAN in the licensed communication band. At this point the process may end.

If the selected pair of concurrent wireless links will not operate on the same channel at 930, flow proceeds to 934. At 934, the concurrent wireless link optimization system in an embodiment may determine if a pair of concurrent wireless links selected for communication are on adjacent channels in the shared communication frequency band. If the selected concurrent wireless links are not on adjacent channels, then the mobile information handling system may establish concurrent wireless links on the WLAN and the unlicensed, small cell WWAN and the flow may end.

If the selected concurrent wireless links are determined to be on adjacent channels at 934, flow proceeds to 936. At 936, the mobile information handling system may implement interference mitigation measures when the selected concurrent wireless links will operate on adjacent channels to reduce the risk of potential interference between concurrent operation on the adjacent channels.

In one example embodiment, the interference reduction system implemented at 936 may be a data scheduler function as described above as between adjacent concurrently operating channels. Use of a data scheduler on adjacent channels would reduce interference between those channels in that simultaneous transmission on those adjacent channels could be avoided reducing interference during active operation on both adjacent channels. Concurrent operation may still occur in a scheduled manner. A data scheduler for transmission of data, receiving data, or both could be implemented in accordance with discussion of the embodiments described herein. The mobile information handling system may implement a data scheduler for either data transmission, receiving data, or both. The transmitter data scheduler for the mobile information handling system may implement one or more queues for each concurrent wireless link and time the data transmissions such that the two selected protocols do no operate simultaneously on the shared wireless communication channel in accordance with embodiments herein.

In another embodiment, the mobile information handling system may implement an adaptive band-pass filter as an interference reduction system at 936 to sharpen the defined channel width and reduce bleed over of radiofrequency noise from shoulders of the transmission channel into the adjacent channels. Although a sharper adaptive band-pass filter may create noise via harmonics for other channels upon implementation, that noise is less that the reduction in noise on adjacent channels concurrently operating from the same mobile information handling system.

The adaptive band-pass filter may be implemented according to techniques understood and implemented in an RF front end digital signal processor (DSP). In an example embodiment, the adaptive band-pass filter may be a modified version of the fixed band-pass filters used in digital signal processors for radiofrequency front end circuitry for a given protocol. Radiofrequency front end circuitry is operatively connected to an antenna and may include front-end digital signal processing to determine or define channels and bands within which radios may operate. The DSP will frequently include fixed, or near fixed band-pass filters defining channels of operation within a designated communication frequency band. Wireless link modems deployed frequently are set with respect to band-pass operation defining channels to limit harmonic noise while sufficiently defining a channel width. These band-pass filters are often an $8^{th}$ order band-pass filter having a lower order or fewer poles and zeroes than a sharper band-pass filter option. These lower order band-pass filters provide a sufficient channel width of frequency but potentially have shoulders or roll off at the ends of the channel frequency width that bleed over into adjacent channels within the same communication band. With transmission and reception on channels from transceivers sufficiently spaced apart, this bleed over impact is lowered. However with concurrently operating wireless links transceiving from the same mobile information handling system, and potentially from the same antenna in some embodiments, the risk of interference from bleed over is higher.

It is understood that the programmable band-pass filter of the present embodiment may be modified to a higher order band-pass filter. In an example embodiment, a Chebyshev-1 band-pass filter may be implemented in place of the normal lower order band-pass filter when adjacent channel pairs are used for concurrent wireless links. Although a Chebyshev-1 type filtering would incur a cost of noise harmonics, potentially across a wider group of channels in the shared communication frequency band, the reduction of bleed over noise from the roll off at the ends of the channel frequency range into the adjacent channels would compensate for this trade off. During operation when non-adjacent channels are used as concurrent wireless links, normal lower-order band-pass filtering may be applied. The Chebyshev-1 type filter is but one example type of higher order filter that may be implemented in any type of higher order band-pass filter may be implemented by those of skill in various embodiments.

The present embodiment proposes addition of programmable logic to the DSP to permit adjustment of the band-pass filter to a higher order for a given channel to enable it to be sharpened during detected adjacent, concurrent wireless link channel operation. In addition to the DSP in the front-end radio frequency circuitry, the wireless link protocol modem may include an application processor for control of the modem and RF transmission including encryption security and other function of transmitting data and communications wirelessly. RF baseband processing may also be included for understood functions such as modulation and demodulation of signals according to protocols to reveal the data signal and a modem application processor.

Upon implementation of an interference reduction system to the concurrently operating wireless links on adjacent channels, the mobile information handling system may establish connection to the selected concurrent wireless links. At this point the process may end.

The above example embodiment of FIG. 9 is not limited to concurrent wireless links that include one WLAN and one small cell WWAN wireless link. It is contemplated that two WLAN links, two small cell WWAN wireless links or other concurrent wireless links operating within a shared communication frequency band may be selected according to the above method. Further, the example embodiment of FIG. 9 refers to selection of potential pairs of concurrent wireless links, but it is contemplated that the above algorithm could be applied to trios of concurrent wireless links or an even greater set of wireless links desired for concurrent operation by a mobile information handling system. The algorithm of FIG. 9 may be applied by those of skill to a trio or greater number of concurrent wireless links for a mobile information handling system.

It is understood that the methods and concepts described in the algorithm above for FIG. 9 may be performed in any sequence or steps may be performed simultaneously in some embodiments. It is also understood that in some varied embodiments certain steps may not be performed at all or additional steps not recited in the above figures may be performed. It is also contemplated that variations on the methods described herein may also be combined with portions of any other embodiments in the present disclosure to form a variety of additional embodiments.

Figure 10:
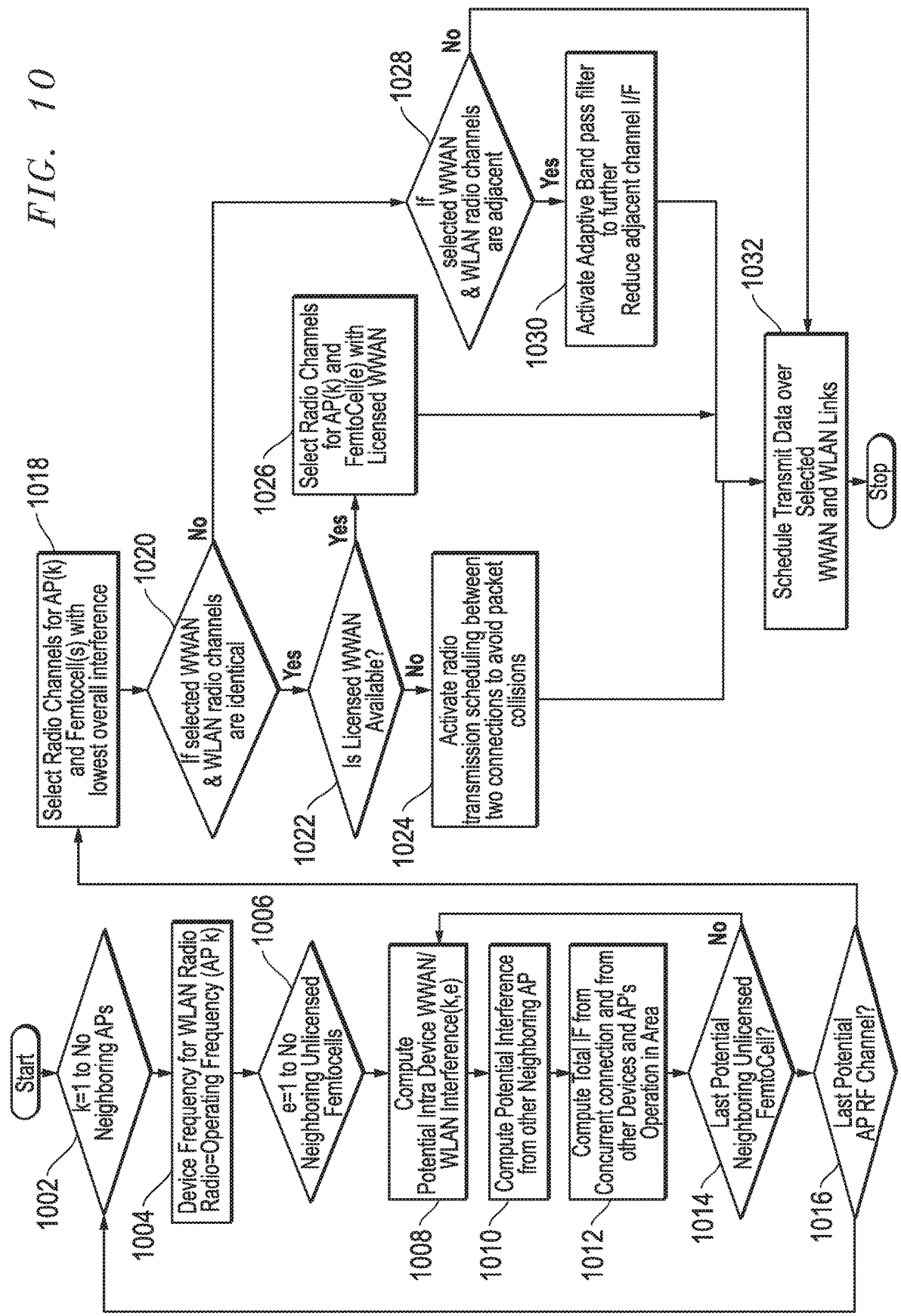
FIG. 10 is a flow diagram illustrating yet another method of determining an optimized communication link via a wireless network using a concurrent wireless link optimization system according to an embodiment of the present disclosure.

FIG. 10 illustrates another method for determining a plurality of concurrent, optimal wireless links according to an embodiment. In this example embodiment, one or more wireless links may be available to a user in a wireless neighborhood as described above. Additionally, the mobile wireless communication device may utilize one or more wireless links for communication. In an example embodiment, a mobile wireless communication device may concurrently use at least two wireless links on a shared radiofrequency communication band. For example, a mobile wireless communication device may utilize WLAN and small cell WWAN wireless links within the shared, wireless communication band. The method of FIG. 9 is not limited to the above wireless link protocols however.

The method of FIG. 10 may be executed via code instructions for a context aware radio resource management system including a concurrent wireless link optimization system on one or more processors or controllers. It is understood that each of the following steps may be performed by the context aware radio resource management system including a concurrent wireless link optimization system at the wireless communication devices, at a remote location in whole or in part, or some combination of the same.

At 1002, the context aware radio resource management system including a concurrent wireless link optimization system may begin by assessing the number of neighboring WLAN APs and unlicensed small cell WWAN substations in a wireless neighborhood. In an embodiment, the small cell WWAN substations may be referred to as Femtocells. For each AP or unlicensed small cell WWAN substations, flow proceeds to 1004 where the concurrent wireless link optimization system will assess the device frequency for the WLAN radio or small cell substation and determine an operating frequency for that wireless link option. An example includes the neighboring interference list described above with respect to FIG. 3.

At 1006, the context aware radio resource management system including a concurrent wireless link optimization system may begin by assessing the number of neighboring unlicensed small cell WWAN substations in a wireless neighborhood. In an embodiment, the small cell WWAN substations may be referred to as Femtocells. For each unlicensed small cell WWAN substation, the concurrent wireless link optimization system will assess the device frequency for the small cell substation and determine an operating frequency for that wireless link option. An example includes the neighboring interference list described above with respect to FIG. 3. Further, at 1006, a determination may be made if an available tandem licensed small cell WWAN substation is available on a separate, licensed communication frequency band in some embodiments.

For each unlicensed small cell WWAN substation and WLAN AP, flow will proceed to 1008 to determine levels of potential intra-device interference with the WLAN AP for candidate concurrent wireless links that may be selected using the shared communication band. This assessment may be conducted pair by pair in an example embodiment. It is understood that intra-device interference could also be conducted trio by trio or by other grouping of concurrent wireless links in some embodiments. In the example embodiment, pairs of possible concurrent wireless links are assessed for same channel or adjacent channel operation. An algorithm similar to above may be used to determine whether the concurrent wireless link pair utilizes a same channel or adjacent channels. In an embodiment, the concurrent wireless link pairs may model anticipated interference based on the channel-defining band-pass filter operation, frequency range of the operating channels, location, power required to transmit, and operation overlap as understood and described with references to embodiments in the disclosure herein.

At 1010, the concurrent wireless link optimization system may also assess potential interference among neighboring APs for the candidate unlicensed small cell WWAN substation and the candidate AP under consideration by similarly modeling interference based on adjacent or same channel operation, proximity, power of transmissions, and operation overlap. During set up of wireless neighborhoods, determination of overlapping channel usage when locating APs or unlicensed small cell WWAN substations may not be coordinated in the wireless neighborhood. This potential interference between APs and unlicensed small cell WWAN substations in the wireless neighborhood is modeled and may factor into selection of a concurrent wireless link pair in some embodiments. Anticipated noise from use of APs or unlicensed small cell WWAN substations in the neighborhood would reach a threshold level in some embodiments to reduce the anticipated QoS of those wireless links sufficiently to lower their ranking in a list of optimized wireless link pairs for concurrent operation in an embodiment.

At 1012 in some embodiments, a total interference factor for both intra-device concurrent wireless link operation and interference at the BTS stage due to usage of neighboring APs or unlicensed small cell WWAN substations is determined. Total interference factor is determined based on the assessment of interference on both the mobile information handling system side and BTS side of a pair of wireless links. In some embodiments, actual interference may be measured during concurrent operation of the wireless link pairs. In other embodiments, modeling based on understood interference factors may be sufficient to determine the overall interference on both sides of the wireless link pair under assessment.

At 1014, the concurrent wireless link optimization system will determine if any additional candidate unlicensed small cell WWAN substation wireless links for concurrent operation remain to be analyzed for interference. If so, flow returns to 1006 to analyze or model interference of a next pair of candidate wireless links in the shared communication frequency band including the next unlicensed small cell WWAN substation in the wireless neighborhood of the mobile information handling system. Similar to the embodiments described herein for interference or collision assessment, the process repeats to determine a rating factor for interference anticipated when selecting each candidate pair of wireless links for concurrent operation.

If not, flow proceeds to 1016 which will determine whether all APs in a wireless neighborhood of a mobile information handling system have been assessed for channel frequency operation and potential intra-device interference and BTS interference within the shared communication frequency band. If not all detected APs in the wireless neighborhood have been assessed, flow returns to 1002 iteratively to assess the next AP. Then the method will iteratively select another candidate unlicensed small cell WWAN substation for pairing with the next AP as a candidate concurrently wireless communication pair and proceed as previously described.

If no additional APs are to be assessed, meaning no additional concurrent wireless link pairs must be analyzed for interference or collision risk, then flow proceeds to 1018. At 1018, the concurrent wireless link optimization system may select a WLAN wireless option and a small cell WWAN wireless link option for concurrent operation. The candidate selection will be made based on having low risk of interference between the wireless links in the pair. The lowest interference may be based solely on intra-device WLAN wireless and small cell WWAN wireless link interference in some embodiments. The lowest interference may be based solely on BTS interference determined for the WLAN wireless and small cell WWAN wireless link in some embodiments. In yet other embodiments, the lowest interference may be based on total interference factors between intra-device WLAN wireless and small cell WWAN wireless link pair for concurrent wireless link operation.

In the present embodiment at 1018, the context aware radio frequency management system may select the concurrent wireless link pair with a low interference level. This candidate concurrent pair with low interference may then be assessed as to whether it has a sufficient QoS rating by the context aware radio resource management system to be acceptable for wireless link operation. Additional factors including power consumption, battery state, cost, and usage trend data determining the type of expected data communication will factor into rating each link of the pair of concurrent wireless links under the context aware radio resource management system according to embodiments described herein. If one of the pair of concurrent wireless links does not meet a threshold rating such as a threshold QoS level, then that lowest risk of interference pair is rejected, and the next lowest risk concurrent wireless link pair is selected. The assessment by the context aware radio resource management system to determine QoS or related optimization ratings for each side of the wireless link pair may be assessed for the next concurrent wireless link pair for sufficiency of their optimization ratings. Weighting factors as described in several embodiments above may be employed by the context aware radio resource management system in deriving optimization ratings at each iteration in some embodiments.

In another embodiment, a selected group of candidate pairs of wireless links for concurrent operation having lower interference determination at 1018 may be assessed for optimization ratings (QoS, usage, power consumption, or cost, etc.) by the context aware radio resource management system. A threshold level of interference determination above which wireless link pairs are not considered may be set. In such an embodiment, a selection from the candidate wireless pairs for concurrent operation may be made based on a highest average optimization rating between the two wireless links in the pair. In other embodiments, the pair selection may be made on other grounds such as determination that all selected pairs have sufficiently high optimization ratings and low interference to select a concurrent wireless pair that does not operate on a same channel or an adjacent channel if that option is available. In some cases, a concurrent wireless link pair may still be selected however that operates on a same channel or adjacent channels within the shared communication frequency band due to limited selection or substantially better QoS or link availability options.

Flow proceeds to 1020 to determine if selected wireless link pairs (e.g., a WLAN and unlicensed small cell WWAN pair) operate on identical radio channels within the shared communication frequency band. If not, flow proceeds to 1028 to determine if the selected wireless link pair operates on adjacent channels within the shared communication frequency band.

At 1028, the context aware radio resource management system with concurrent wireless link optimization may determine that the selected concurrent WLAN and unlicensed WWAN wireless links are not operating on adjacent channels in the shared communication frequency band. If the selected pair of concurrent wireless links are not operating on adjacent channels, flow proceeds to 1032 where the optimized, concurrent wireless link pair that is selected is activated. The wireless adapter and the context aware radio resource management system will establish and schedule data transmission over the selected concurrent WLAN and unlicensed WWAN wireless links. If, however, the selected pair of concurrent wireless links are operating on adjacent channels at 1028, flow proceeds to 1030 to implement an adaptive band-pass filter to reduce interference as between concurrently operating adjacent channels within the shared communication frequency band. At 1030, the context aware radio resource management system including a concurrent wireless link optimization system may activate adaptive band-pass filtering between the adjacent channels to reduce potential overlap interference. The adaptive band-pass filter may activate a higher order band-pass filter in a DSP of front end radio circuitry for the two concurrently operating wireless link protocol radios. The adaptive band-pass filter may operate according to embodiments described above to sharpen the frequency range of each of the defined adjacent channels. It is understood that according to the adaptive band-pass filter descriptions above, a variety of higher order filters may be implemented for a period of time when concurrent and adjacent channel operation occurs. It is understood that the adaptive band-pass filtering may be executed via programmability logic in the DSP band-pass filtering function and may be implemented in accordance with embodiments described herein.

In some example embodiments, a data scheduler may be used instead of or in addition to the adaptive band-pass filter at 1030 to mitigate interference between adjacent channels (not shown). The data scheduler may operate in accordance with embodiments described above to implement round-robin operation, modified round-robin operation, or to prioritize data by levels and schedule data transmission or receipt based on the priority levels. Several embodiments are described herein to implement the data scheduler. Upon determining that the concurrent WLAN and unlicensed WWAN wireless links will operate on adjacent channels with application of an adaptive band-pass filter at 1030, flow may proceed to 1032 where the optimized, concurrent wireless link pair is activated. The context aware radio resource management system and the mobile information handling system wireless adapter may schedule to transmit data on the selected concurrent wireless links. At this point the flow may end with the selected concurrent wireless link activation.

If the selected wireless link pair is determined to operate on an identical channel however 1020, flow proceeds to 1022. At 1022, the context aware radio resource management system with concurrent wireless link optimization will determine if an anchor licensed WWAN wireless link is available to replace the unlicensed small cell WWAN in the selected pair instead of using concurrent wireless links operating on a same channel. If an anchor licensed small cell WWAN that that will not operate on the same channel is available, then flow may proceed to 1026.

At 1026 the context aware radio resource management system with concurrent wireless link optimization will select a pair for concurrent communication that includes a WLAN link on the unlicensed communication band and a small cell WWAN wireless link operating on a licensed communication band. In an embodiment, a specific WWAN licensed channel may be used as an anchor link and may direct selected channels between licensed and unlicensed options over a control communication channel in some aspects. In one aspect, context aware radio resource management system with concurrent wireless link optimization turns off the supplemental unlicensed small cell WWAN option such that the default option will be the anchor licensed small cell WWAN wireless link available on licensed band through a wireless carrier. It is understood that in an embodiment the mobile information handling system will have both the anchor licensed small cell WWAN option available as well as the supplemental unlicensed WWAN link as with the example LTE-LAA protocol. Turning off the unlicensed small cell WWAN radio defaults to the anchor licensed small cell WWAN radio. In this manner the licensed small cell WWAN wireless link may be selected in lieu of the unlicensed small cell WWAN link operating on the same channel as a selected WLAN link. Flow will then proceed to 1032 to set up concurrent transmission on the selected licensed WWAN wireless link and the WLAN link in unlicensed, shared spectrum. At this point, the flow may end.

Returning to 1022, if no anchor licensed WWAN wireless link is available to replace the unlicensed small cell WWAN in the selected pair, flow may proceed to 1024. At 1024, the concurrent wireless link optimization system may activate collision or interference mitigation due to the selected concurrent wireless link pair having to operate on an identical channel in the shared communication band. In an example embodiment, the collision mitigation may include activating a scheduler to alternate transmission between the concurrent wireless links operating on the same channel within the shared wireless communication band. The data transmission scheduler system is described above in several embodiments. Sequential radio transmissions or reception may be scheduled as between the concurrent WLAN and unlicensed small cell WWAN pair in some embodiments. In other embodiments, round robin scheduling, modified round robin scheduling, or data priority scheduling may be implemented.

In another embodiment, if no anchor licensed WWAN wireless link is available to replace the unlicensed small cell WWAN in the selected pair at 1022, the concurrent wireless link optimization system may opt to deactivate one of the concurrent wireless links rather than risk data collision by operation on the same channel.

In an example embodiment, the mobile information handling system may deactivate the small cell unlicensed radio channel since it may provide for fewer wireless link options or may serve in some embodiments as additional wireless bandwidth to a WLAN wireless link. Deactivation of one concurrent wireless link may also serve as an interference mitigation measure. In other embodiments, the WLAN option may be deactivated. Deactivation may occur in some embodiments due to the unacceptable aspect of potential data collision during same channel operation.

Upon determining that both the WLAN and unlicensed WWAN wireless links will operate concurrently on a same channel via a data scheduler at 1024 since no licensed WWAN wireless link is available, flow may proceed to 1032. At 1032, the context aware radio resource management system and the mobile information handling system wireless adapter may schedule to transmit data on the concurrent wireless links operating in the shared communication frequency band. If deactivation of one concurrent wireless link has occurred, only the other active wireless link may be scheduled for data transmission at 1032.

The mobile information handling system may thereby maximize usage and bandwidth on unlicensed, shared communication frequency bands for transmission of data according to the above. Typically these unlicensed, shared communication frequency bands are lower cost and may have high availability or bandwidth when QoS objectives are met. Thus, maximizing utilization with concurrent wireless links with lower risk of interference provides a benefit to the mobile information handling system operation. At this point, the process may end.

The above example embodiment of FIG. 10 is also not limited to concurrent wireless links that include one WLAN and one small cell WWAN wireless link. It is contemplated that other combinations of concurrent wireless links operating within a shared communication frequency band may be selected according to the above. Further, the example embodiment of FIG. 10 refers to selection of potential pairs of concurrent wireless links, but it is contemplated that the above algorithm could be applied to trios of concurrent wireless links or an even greater set of wireless links desired for concurrent operation by a mobile information handling system. The algorithm of FIG. 10 may be applied by those of skill to a trio or greater number of concurrent wireless links for a mobile information handling system.

It is understood that the methods and concepts described in the algorithm above for FIG. 10 may be performed in any sequence or steps may be performed simultaneously in some embodiments. It is also understood that in some varied embodiments certain steps may not be performed at all or additional steps not recited in the above figures may be performed. It is also contemplated that variations on the methods described herein may also be combined with portions of any other embodiments in the present disclosure to form a variety of additional embodiments. For example, aspects of FIGS. 8, 9 and 10 may be modified as understood by those of skill to implement variations described therein from either figure embodiment.

In some embodiments, dedicated hardware implementations such as application specific integrated circuits, programmable logic arrays and other hardware devices can be constructed to implement one or more of the methods described herein or portions of one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as an Intel® Core™ or ARM® RISC brand processors, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A computer implemented method comprising:
   receiving, at a processor, a mobile broadband traffic report comprising a spatial-temporal radio frequency profile indicating radio frequency quality of service for wireless links in a location of a wireless transceiving device;
   determining, via an application processor executing code instructions, a plurality of optimal wireless links from a plurality of available wireless links within a shared communication frequency band at the location based on a spatial-temporal radio frequency profile indicating signal quality for the plurality of available wireless links;
   selecting a first WWAN small cell wireless link and a second WWAN small cell wireless link from the plurality of optimal wireless links for concurrent communication via the wireless transceiving device; and
   determining local interference between the selected first WWAN small cell wireless link and the selected second WWAN small cell wireless link based on channel occupancy in the shared communication frequency band via execution of code instructions of a concurrent wireless link optimization system,
   wherein if the determination of local interference between the selected first WWAN small cell wireless link and the selected second WWAN small cell wireless link reaches an interference threshold level, switching the second WWAN small cell wireless link to a non-adjacent frequency band for WWAN small cell concurrent wireless communication.

2. The method of claim 1, wherein the plurality of optimal wireless links for concurrently operating within the shared communication frequency band includes at least one 5G small cell WWAN wireless link.

3. The method of claim 1, further comprising:
the interference threshold level is whether the selected first WWAN small cell wireless link and the selected second WWAN small cell wireless link are operating on a same channel in the shared communication frequency band.

4. The method of claim 1, further comprising:
the interference threshold level is whether the selected first WWAN small cell wireless link and the selected second WWAN small cell wireless link are operating on adjacent channels in the shared communication frequency band.

5. The method of claim 1, further comprising:
determining if the selected first WWAN small cell wireless link and the selected second WWAN small cell wireless link are operating on adjacent channels in the shared communication frequency band; and
initiating an interference reduction system between the adjacent channels.

6. The method of claim 5, wherein the interference reduction system is application of an adaptive band-pass filter to avoid interference across the adjacent channels within the shared communication frequency band.

7. The method of claim 5, wherein the interference reduction system is application of transmission scheduling between the adjacent channels to avoid interference by simultaneous operation across the adjacent channels within the shared communication frequency band.

8. An information handling system comprising:
at least one wireless adapter for communicating on a plurality of available wireless links with a corresponding first small cell WWAN base station or with a corresponding second small cell WWAN base station concurrently operating within a shared communication frequency band;
an application processor executing code instructions of a radio resource management system for determining a plurality of optimal wireless links from the plurality of available wireless links within the shared communication frequency band based on signal quality for the plurality of available wireless links for a determined location of the information handling system; and
the application processor selecting, via a concurrent wireless link optimization system, a first WWAN small cell wireless link radio frequency channel and a second WWAN small cell wireless link radio frequency channel from the plurality of optimal wireless links for concurrent wireless communication to avoid local interference in the shared communication frequency band unless an interference threshold level for the concurrent communication is reached and then initiating an interference reduction measure to avoid interference in the concurrent communication, wherein the interference reduction measure is to switch the first WWAN small cell wireless link or the second WWAN small cell wireless link to a third WWAN small cell wireless link operating on a non-adjacent channel in the shared communication frequency band for the concurrent wireless communication.

9. The system of claim 8, further comprising:
the interference reduction measure switching the second small cell WWAN wireless link to different communication frequency band for the concurrent wireless communication.

10. The system of claim 8, further comprising:
the interference threshold level is whether the selected first WWAN small cell wireless link radio frequency channel and the selected second small cell WWAN wireless link radio frequency channel are operating on adjacent channels in the shared communication frequency band.

11. The system of claim 8, further comprising:
the application processor to determine if the selected first WWAN small cell wireless link radio frequency channel and the selected second WWAN small cell wireless link radio frequency channel are operating on adjacent channels in the shared communication frequency band; and
the application processor to initiate transmission scheduling as the interference reduction measure between the at least two selected optimal wireless links on the adjacent channels to avoid interference across the adjacent channels within the shared communication frequency band.

12. The system of claim 8, further comprising:
the interference reduction measure is to switch the selected first WWAN small cell wireless link radio frequency channel to the third WWAN small cell wireless link radio frequency channel on a ranked list of optimal wireless links operating on a non-adjacent channel in the shared communication frequency band if it has better signal quality than switching the selected second WWAN small cell wireless link radio frequency channel.

13. An information handling system comprising:
a wireless adapter for communicating on a plurality of available wireless links with a corresponding first small cell WWAN base station or with a corresponding second small cell WWAN base station concurrently operating within a shared communication frequency band;
a controller at the wireless adapter for executing code instructions of a radio resource management system for determining a plurality of optimal wireless links from the plurality of available wireless links within the shared communication frequency band based on signal quality for the plurality of available wireless links for a location of the information handling system; and
the controller selecting, via a concurrent wireless link optimization system, a first WWAN small cell wireless link radio frequency channel and a second WWAN small cell wireless link radio frequency channel from the plurality of optimal wireless links for concurrent wireless communication to avoid local interference in the shared communication frequency band unless an interference threshold level for the concurrent communication is reached and then initiating an interference reduction measure to avoid interference in the concurrent communication, wherein the interference reduction measure is to switch the first WWAN small cell wireless link or the second WWAN small cell wireless link to a third WWAN small cell wireless link operating on a non-adjacent channel in the shared communication frequency band for the concurrent wireless communication.

14. The system of claim 13, further comprising:
the interference reduction measure is to switch the second small cell WWAN wireless link to different communication frequency band for the concurrent wireless communication.

15. The system of claim 13, further comprising:
the interference threshold level is whether the selected first WWAN small cell wireless link radio frequency channel and the selected second small cell WWAN wireless link radio frequency channel are operating on adjacent channels in the shared communication frequency band.

16. The system of claim 13, further comprising:
the controller to determine if the selected first WWAN small cell wireless link radio frequency channel and the selected second WWAN small cell wireless link radio frequency channel are operating on adjacent channels in the shared communication frequency band; and
the controller to initiate transmission scheduling as the interference reduction measure between the at least two selected optimal wireless links on the adjacent channels to avoid interference across the adjacent channels within the shared communication frequency band.

17. The system of claim 13, further comprising:
the interference reduction measure is to switch the selected first WWAN small cell wireless link radio frequency channel to the third WWAN small cell wireless link radio frequency channel on a ranked list of optimal wireless links operating on a non-adjacent channel in the shared communication frequency band if it has better signal quality than switching the selected second WWAN small cell wireless link radio frequency channel.

18. The system of claim 13, further comprising:
the interference reduction measure is to switch the selected first WWAN small cell wireless link radio frequency channel to a WLAN access point wireless link radio frequency channel on a ranked list of optimal wireless links operating on a non-adjacent channel in the shared communication frequency band if it has better signal quality than switching the selected second WWAN small cell wireless link radio frequency channel.

19. The system of claim 13, wherein the plurality of available wireless links concurrently operating within the shared communication frequency band includes at least one 5G small cell WWAN wireless link.

20. The system of claim 13, wherein the corresponding first small cell WWAN base station and the corresponding second small cell WWAN base station concurrently operating within the shared communication frequency band are 5G small cell WWAN base stations.

* * * * *